US012228666B2

(12) United States Patent
Duan et al.

(10) Patent No.: US 12,228,666 B2
(45) Date of Patent: Feb. 18, 2025

(54) MITIGATION OF IMPACT OF OSCILLATOR ERROR ON DOPPLER ESTIMATION FOR RADIO FREQUENCY SENSING

(71) Applicant: QUALCOMM Incorporated, San Diego, CA (US)

(72) Inventors: Weimin Duan, San Diego, CA (US); June Namgoong, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/858,573

(22) Filed: Jul. 6, 2022

(65) Prior Publication Data

US 2024/0012086 A1 Jan. 11, 2024

(51) Int. Cl.
*G01S 5/02* (2010.01)
(52) U.S. Cl.
CPC .......... *G01S 5/0246* (2020.05); *G01S 5/0236* (2013.01)
(58) Field of Classification Search
CPC .............................. G01S 5/0246; G01S 5/0236
USPC ......... 342/461, 112, 357.42, 139, 357.62, 28
See application file for complete search history.

(56) References Cited

U.S. PATENT DOCUMENTS

| 2017/0176583 A1 | 6/2017 | Gulden et al. | |
| 2020/0408890 A1 | 12/2020 | Klar et al. | |
| 2022/0095319 A1* | 3/2022 | Duan ................ | H04W 72/1268 |
| 2022/0104111 A1* | 3/2022 | Zorgui .................... | G01S 13/04 |
| 2022/0268912 A1* | 8/2022 | Zhang ..................... | H04W 4/02 |

FOREIGN PATENT DOCUMENTS

WO 2022107050 A1 5/2022

OTHER PUBLICATIONS

International Search Report and Written Opinion—PCT/US2023/021411—ISA/EPO—Aug. 29, 2023.
Chen Xu, et al., "Downlink and Uplink Cooperative Joint Communication and Sensing", arXiv:2211.04065v1 [cs.IT], Arxiv.Org, Cornell University Library, 201 Olin Library Cornell University Ithaca, NY 14853, Nov. 8, 2022, pp. 1-14, XP091363792, Sections I, II, Figures 1,3.
Wahab A., et al., "A Novel Bistatic-SAR Simulation-Based on Fixed Receiver", 2020 IEEE 23rd International Multitopic Conference (INMIC), Nov. 5-7, 2020, 6 Pages.

* cited by examiner

*Primary Examiner* — Bo Fan
(74) *Attorney, Agent, or Firm* — Procopio, Cory, Hargreaves & Savitch LLP/Qualcomm

(57) ABSTRACT

Radio frequency (RF) sensing by a sensing entity with an oscillator that introduces frequency errors is supported using dual direction bistatic sensing. The sensing entity transmits a sensing signal that is reflected by an object and received by a second sensing entity, which measures a first frequency offset that includes an oscillator error from the transmission of the sensing signal and a Doppler shift from the object. The sensing entity also receives and measures a second frequency offset of a sensing signal transmitted by the second sensing entity and reflected by the object, which includes a second frequency offset that includes an oscillator error from the reception of the sensing signal and a Doppler shift from the target object. The velocity of the object may be estimated based on a combination of the first and second frequency offsets, which cancels the oscillator error caused by the sensing entity.

28 Claims, 9 Drawing Sheets

MITIGATION OF IMPACT OF OSCILLATOR ERROR ON DOPPLER ESTIMATION FOR RADIO FREQUENCY SENSING

BACKGROUND

Field

Subject matter disclosed herein relates generally to wireless communication, and more specifically, to radio frequency sensing in a wireless communication system.

Information

Radar is a ranging technique that can be used to determine the distances of objects relative to a given location. A radar system operates by transmitting and receiving electromagnetic pulses. Some of the pulses reflect off objects or surfaces along the transmission path, producing "echoes." The radar system may determine the distances of the objects or surfaces based on a round trip time between the transmission of a pulse to the reception of an echo of that pulse.

In a mono-static radar system, the antennas used to transmit the pulses ("transmit antennas") are collocated with the antennas used to receive the echoes ("receive antennas"). For example, the transmit antennas and receive antennas are often disposed on the same device. This allows for simple synchronization between the timing of the transmitted pulses and the timing of the received echoes since the same device (or system) clock may be used for both. In a multi-static radar system, the transmit antennas are located a substantial distance away from the receive antennas. The spatial diversity afforded by multi-static radar systems provides a high accuracy of target location and allows different aspects of a target to be viewed simultaneously.

Radio frequency (RF) sensing is a technique, similar to (and may include) radar, that can be used to determine one or more of the presence, location, velocity, identity, or combination thereof of objects. RF sensing, for example, may be used in wireless communication systems, such as cellular communications system (5G and 5G beyond). With a large bandwidth allocated to, e.g., 5G and 5G beyond, cellular communications system RF sensing may be considered a critical feature in future cellular systems. Improvements for RF sensing are desired.

SUMMARY

Radio frequency (RF) sensing by a sensing entity, such as a user equipment (UE), with an oscillator that introduces frequency errors, is supported using dual direction bistatic sensing. The dual direction bistatic sensing may be downlink (DL) and uplink (UL) or sidelink (SL) and SL. The sensing entity, for example, transmits a sensing signal that is reflected by the target object and received by a second sensing entity, which measures a first frequency offset that includes an oscillator error from the transmission of the sensing signal and a Doppler shift from the target object. The sensing entity also receives and measures a second frequency offset of a sensing signal transmitted by the second sensing entity and reflected by the target object, which includes a second frequency offset that includes an oscillator error from the reception of the sensing signal and a Doppler shift from the target object. The velocity of the object may be estimated based on a combination of the first and second frequency offsets, which cancels the oscillator error caused by the sensing entity.

In one implementation, a method performed by a first sensing entity for supporting dual direction bistatic radio frequency (RF) sensing, includes transmitting a first sensing signal to be reflected by a target object and received by a second sensing entity, wherein the second sensing entity measures a first frequency offset of the first sensing signal; receiving a second sensing signal that is transmitted by the second sensing entity and reflected by the target object; measuring a second frequency offset of the second sensing signal, wherein a velocity of the target object is estimated based on both the first frequency offset of the first sensing signal and the second frequency offset of the second sensing signal.

In one implementation, a first sensing entity configured for supporting dual direction bistatic radio frequency (RF) sensing, includes at least one wireless transceiver; at least one memory; and at least one processor coupled to the at least one wireless transceiver and the at least one memory, wherein the at least one processor is configured to cause the first sensing entity to: transmit a first sensing signal to be reflected by a target object and received by a second sensing entity, wherein the second sensing entity measures a first frequency offset of the first sensing signal; receive a second sensing signal that is transmitted by the second sensing entity and reflected by the target object; measure a second frequency offset of the second sensing signal, wherein a velocity of the target object is estimated based on both the first frequency offset of the first sensing signal and the second frequency offset of the second sensing signal.

In one implementation, a first sensing entity configured for supporting dual direction bistatic radio frequency (RF) sensing, includes means for transmitting a first sensing signal to be reflected by a target object and received by a second sensing entity, wherein the second sensing entity measures a first frequency offset of the first sensing signal; means for receiving a second sensing signal that is transmitted by the second sensing entity and reflected by the target object; means for measuring a second frequency offset of the second sensing signal, wherein a velocity of the target object is estimated based on both the first frequency offset of the first sensing signal and the second frequency offset of the second sensing signal.

In one implementation, a non-transitory storage medium including program code stored thereon, the program code is operable to configure at least one processor in a first sensing entity for supporting dual direction bistatic radio frequency (RF) sensing, the program code comprising instructions to: transmit a first sensing signal to be reflected by a target object and received by a second sensing entity, wherein the second sensing entity measures a first frequency offset of the first sensing signal; receive a second sensing signal that is transmitted by the second sensing entity and reflected by the target object; measure a second frequency offset of the second sensing signal, wherein a velocity of the target object is estimated based on both the first frequency offset of the first sensing signal and the second frequency offset of the second sensing signal.

In one implementation, a method performed by a first entity for supporting dual direction bistatic radio frequency (RF) sensing, includes obtaining a first frequency offset of a first sensing signal measured by a first sensing entity, the first sensing signal transmitted by a second sensing entity, reflected by a target object, and received by the first sensing entity; obtaining a second frequency offset of a second sensing signal measured by the second sensing entity, the second sensing signal transmitted by the first sensing entity, reflected by the target object, and received by the second sensing entity; and estimating a velocity of the target object based on both the first frequency offset measurement of the first sensing signal and the second frequency offset measurement of the second sensing signal.

In one implementation, a first entity configured for supporting dual direction bistatic radio frequency (RF) sensing, includes an external interface; at least one memory; and at least one processor coupled to the external interface and the at least one memory, wherein the at least one processor is configured to cause the first entity to: obtain a first frequency offset of a first sensing signal measured by a first sensing entity, the first sensing signal transmitted by a second sensing entity, reflected by a target object, and received by the first sensing entity; obtain a second frequency offset of a second sensing signal measured by the second sensing entity, the second sensing signal transmitted by the first sensing entity, reflected by the target object, and received by the second sensing entity; and estimate a velocity of the target object based on both the first frequency offset measurement of the first sensing signal and the second frequency offset measurement of the second sensing signal.

In one implementation, a first entity configured for supporting dual direction bistatic radio frequency (RF) sensing, includes means for obtaining a first frequency offset of a first sensing signal measured by a first sensing entity, the first sensing signal transmitted by a second sensing entity, reflected by a target object, and received by the first sensing entity; means for obtaining a second frequency offset of a second sensing signal measured by the second sensing entity, the second sensing signal transmitted by the first sensing entity, reflected by the target object, and received by the second sensing entity; and means for estimating a velocity of the target object based on both the first frequency offset measurement of the first sensing signal and the second frequency offset measurement of the second sensing signal.

In one implementation, a non-transitory storage medium including program code stored thereon, the program code is operable to configure at least one processor in a first entity for supporting dual direction bistatic radio frequency (RF) sensing, the program code comprising instructions to: obtain a first frequency offset of a first sensing signal measured by a first sensing entity, the first sensing signal transmitted by a second sensing entity, reflected by a target object, and received by the first sensing entity; obtain a second frequency offset of a second sensing signal measured by the second sensing entity, the second sensing signal transmitted by the first sensing entity, reflected by the target object, and received by the second sensing entity; and estimate a velocity of the target object based on both the first frequency offset measurement of the first sensing signal and the second frequency offset measurement of the second sensing signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
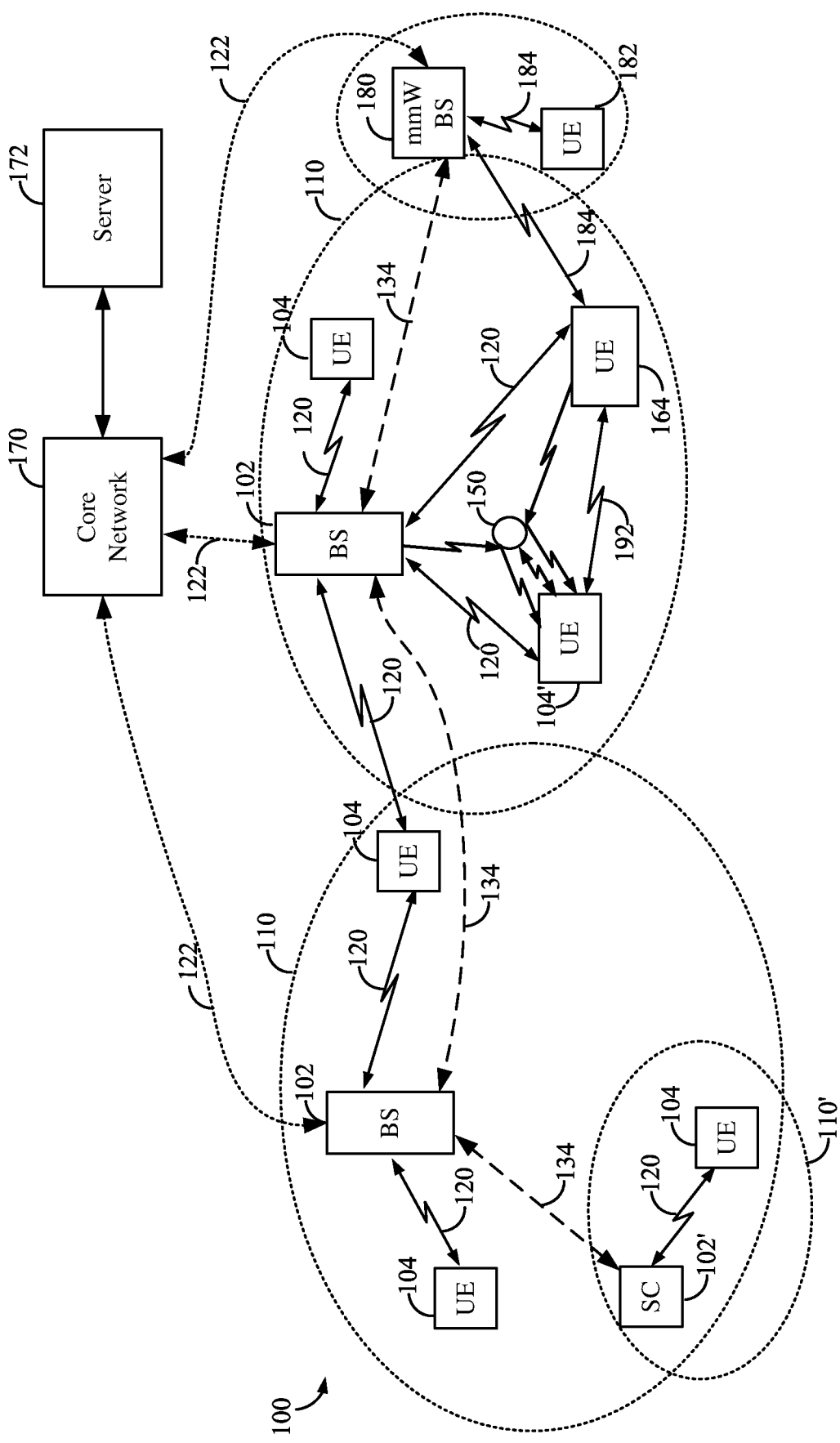
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure.

Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on. UEs may be embodied by any of a number of types of devices including but not limited to printed circuit (PC) cards, compact flash devices, external or internal modems, wireless or wireline phones, smartphones, tablets, consumer asset tracking devices, asset tags, and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which a UE signals to another UE is called a sidelink (SL) or sidelink channel. As used herein, the term traffic channel (TCH) can refer to either an UL/reverse, DL/forward, or SL traffic channel.

The term "base station" may refer to a single physical transmission-reception point (TRP), which may also be referred to as a transmit/receive point, or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

Radio frequency (RF) sensing is a technique, similar to (and may include) radar, that can be used to determine one or more of the presence, location, velocity, identity, or combination thereof of objects in the environment. RF sensing, for example, may be used to image the environment, based on one or more of range, Doppler, and angle information. The use of RF signals with higher frequencies, larger bandwidths, or transmission/reception from a compact array may provide better granularity for sensing the environment, which may be applicable to a mobile device or AP for sensing.

By way of example, a handheld radar device becomes promising in applications such as gesture classification and in-car-based control etc. In a handheld radar device, a sensing chip may send the RF (radar) signals with pre-defined waveform, e.g., frequency modulated continuous wave (FMCW) and pulse. The reflected signals (Rx) from an object, such as the user's hand, are received and correlated with the transmitted signals Tx from which one or more of the range, Doppler, angle information may be determined. The object and/or motions of the object may be classified and mapped to designed actions.

Integrated Sensing and Communication (ISAC) technologies are another example of the use of RF (radar) signals to sense the environment. ISAC seeks to enable the combination of the sensing and communication systems to utilize resources efficiently and even to pursue mutual benefits. ISAC is of interest to the 3rd Generation Partnership Project (3GPP), which is standardization body for mobile telecommunications, to explore the sensing functions in the legacy communication structures. By way of example, some companies propose to enable the work in Service and System Aspects (SA), where the sensing resource is configured by the network, and coexists with data transmission.

In monostatic RF sensing, the transmitter and receiver are collocated in a single device, e.g., in a UE or in a base station and self-interference may occur. In contrast, in a multi-static RF sensing system, including a bistatic RF sensing system, the transmitter and receiver are in different devices, e.g., separated by a distance comparable to the expected target distance. Accordingly, self-interference difficulties that may be found in monostatic sensing systems are not present in multistatic/bistatic sensing systems.

In practice, however, the transmitting device and/or receiving device in a multistatic/bistatic sensing system may include an oscillator error. For example, oscillators used by UEs are typically not temperature controlled, and accordingly may introduce sizable errors in the generated frequency, which varies throughout the day depending on the temperature. Other sources may also contribute to oscillator errors, particularly in UEs. Accordingly, when a frequency offset of an RF sensing signal received by a UE is measured by the UE, the frequency offset includes not only the Doppler shift induced by the target object but also a sizable oscillator error. Similarly, the frequency offset of an RF sensing signal that was transmitted by a UE and received by another device, such as a base station (e.g., with a stable oscillator), will also include not only the Doppler shift induced by the target object but also the oscillator error caused by the UE oscillator.

In wireless communications, the UE modem does not attempt to distinguish the Doppler shift from the oscillator errors. In wireless communications, the sum of both frequency offset caused by Doppler shift and oscillator error are estimated and compensated for by employing frequency tracking loop (FTL), which leads to satisfactory modem performance.

However, for RF sensing, it is desirable to accurately determine the Doppler shift introduced by the target object in order to determine the motion of the target object itself. Hence, it is necessary to remove the estimation bias caused by the oscillator error from the total frequency offset estimate (including both Doppler shift and oscillator error) in order to obtain accurate Doppler shift estimates.

As discussed herein, dual direction bistatic sensing, such as DL+UL or SL+SL, may be used to determine an accurate velocity of a target object from the Doppler shift by cancelling the oscillator error caused by the transmission and reception of sensing signals by a sensing entity.

FIG. 1 illustrates an example wireless communications system 100. The wireless communications system 100 (which may also be referred to as a wireless wide area network (WWAN) or a wireless network (e.g., a cellular network) may include various base stations 102, sometimes referred to herein as gNBs 102 or other types of NB s, and various UEs 104. The base stations 102 may include macro cell base stations (high power wireless base stations) and/or small cell base stations (low power wireless base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more sensing servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by a WLAN AP. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs that connects indirectly to one or more communication networks via one or more device-to-device (D2D) peer-to-peer (P2P) links. In the example of FIG. 1, UE 164 has a D2D P2P link 192 with one of the UEs 104 connected to one of the base stations 102. Link 192 may be used to indirectly obtain wireless connectivity or for D2D communications between UEs 104 and 164 without use of the base station 102. In some implementations, the link 192 is a sidelink (SL) between the UEs 104 and 164. In an example, the D2D P2P link 192 may be supported with any well-known D2D RAT, such as LTE Direct (LTE-D), WiFi Direct (WiFi-D), Bluetooth®, and so on.

The wireless communications system 100 may include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

As illustrated in FIG. 1, the UE 104' may sense an object 150 in the environment based on one or more RF sensing. The RF sensing, for example, may include mono-static sensing and multi-static sensing, such as bistatic sensing. In a mono-static sensing system, the UE 104' both transmits the RF signal and receives the RF signal that is reflected from the object 150. In a multi-static sensing system, the UE 104' may receive an RF signals reflected from the object 150 that is transmitted from another device, such as base station 102 or UE 164. An example of multi-static sensing is a bistatic system in which one transmitting device transmits and one receiving device receives, but any number of transmitting devices or receiving devices may exist. While UE 104' is illustrated in FIG. 1 as the receiving device, if desired a base station 102 may be the receiving device, in a mono-static sensing system or a multi-static sensing system, e.g., with a UE 104 (or UE 164) or another base station 102 transmitting the RF signals that are reflected from the object.

The wireless communications system 100 may include a sensing server 172, which may be external to the core network 170 or internal to the core network 170. The sensing server 172 may be used to configure the wireless network to support RF sensing. For example, in some implementations, the sensing server 172 may configure sensing resources of the sensing entities, e.g., UE 104' and base station 102. The sensing server 172 may provide assistance data to the sensing entities and may send a request for sensing. The sensing server 172 may further be configured receive reports from sensing entities and to determine one or more parameters of the object 150 based on the reports.

Figure 2:
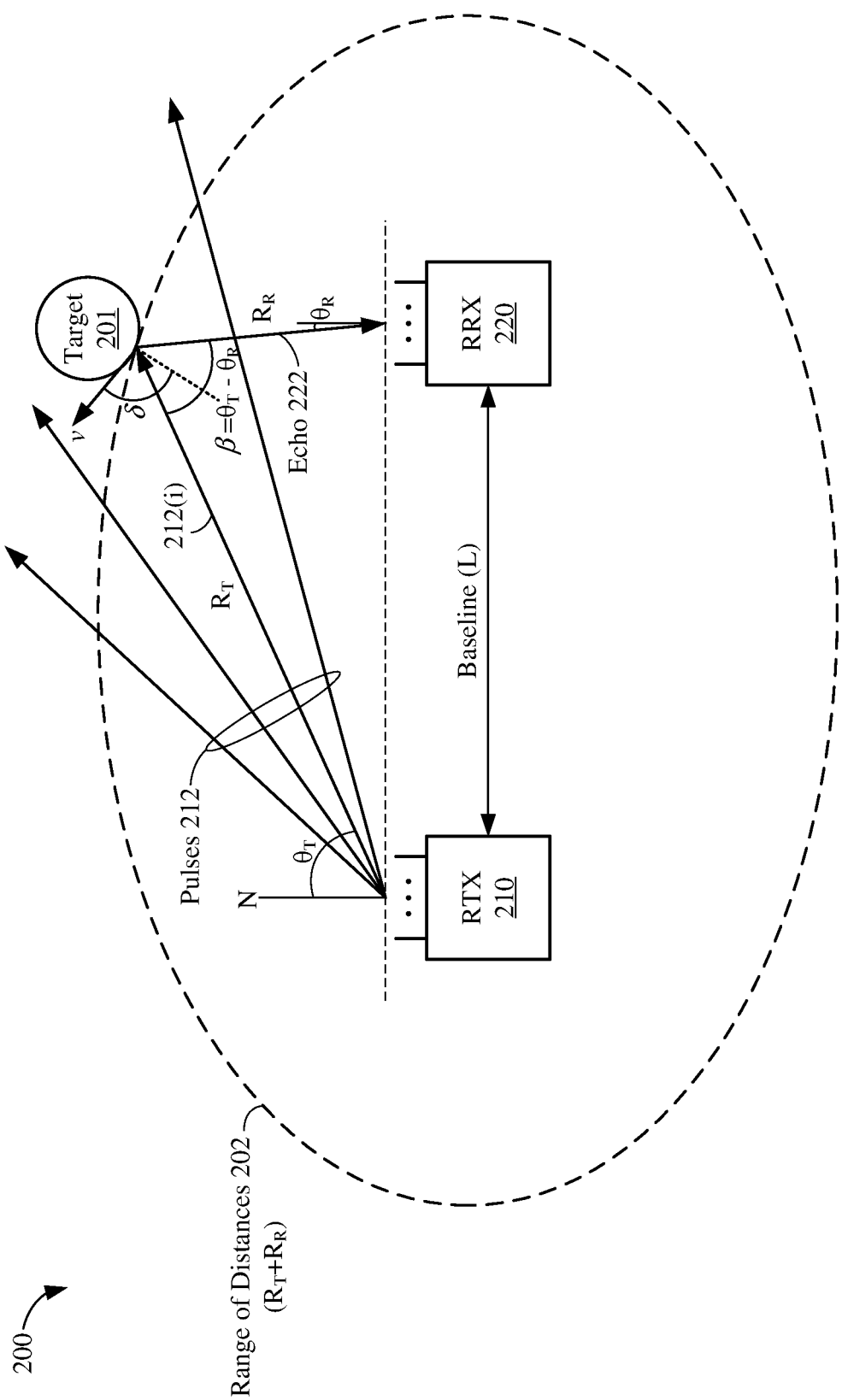
FIG. 2 shows an example of a bistatic sensing system.

FIG. 2 shows an example bistatic sensing system 200. The bistatic sensing system 200 includes an RF transmitter (RTX) 210 and an RF receiver (RRX) 220. The RF transmitter 210 and the RF receiver 220 are spatially separated by a baseline (L). In some implementations, the RF transmitter 210 may be one example of a base station 102 (or UE 104) and the RF receiver 220 may be an example of one of a different base station 102 (or UE 104) of FIG. 1.

The RF transmitter 210 is configured to transmit RF pulses 212 in a number of directions. Each of the pulses 212 may be a beamformed RF signal having a particular width and directionality. Objects or surfaces along the trajectory of any of the pulses 212 may cause the pulses 212 to reflect or scatter. Reflected pulses may be referred to as "echoes" of the pulses from which they originate. In the example of FIG. 2, a target object 201 is located along the path of one of the RF pulses 212. The RF pulse 212(i) incident on the target object 201 is reflected as an echo 222. As shown in FIG. 2, the echo 222 is reflected in the direction of the RF receiver 220. The RF receiver 220 may determine ranging, Doppler, or angle information about the target object 201 based on the reception of the echo 222. For example, ranging information with respect to the target object 201 may be determined, including, but not limited to, a distance, direction, or velocity of the target object 201.

In some implementations, the RF receiver 220 may determine a distance ($R_R$) of the target object 201 relative to the RF receiver 220 based, at least in part, on the baseline distance L (between the RF transmitter 210 and the RF receiver 220), an angle of arrival ($\theta_R$) of the echo 222, and a time of flight ($\tau$) from the transmission of the incident pulse 212(i) by the RF transmitter 210 to the reception of the resulting echo 222 by the RF receiver 220. More specifically, the distance $R_R$ can be calculated according to Equation 1.

$$R_R = \frac{(R_T + R_R)^2 - L^2}{2(R_T + R_R - L \cos \theta_R)} \quad (1)$$

where $R_T+R_R$ represents the combined distances from the target object 201 to each of the RF transmitter 210 and the RF receiver 220. As shown in FIG. 2, $R_T+R_R$ defines a range of distances 202 around the RF transmitter 210 and the RF receiver 220 (in the shape of an ellipse) in which the target object 201 may be located. More specifically, $R_T+R_R$ can be calculated, according to Equation 2, as a function of the baseline (L), the time of flight of the reflected pulse ($\tau$), and the propagation speed of the RF pulses, i.e., speed of light (c).

$$R_T+R_R=c\tau+L \quad (2)$$

With reference to Equations 1 and 2, the baseline L and propagation speed c p represent fixed or preconfigured values inherent to the sensing system 200. The angle of arrival $\theta_R$ may be determined based on a time difference of arrival (TDOA) of the echo 222 between different receive antennas of the RF receiver 220 in an antenna array or based on the antenna sector (corresponding to a preset beam of a phased array antenna) used by the RF receiver 220 to receive the echo 222. However, to calculate the time of flight $\tau$, the RF receiver 220 must have knowledge of the time at which the incident pulse 212(i) was transmitted at the position of the receiver. More specifically, the time of flight $\tau$ can be calculated, according to Equation 3, as a function of the time of transmission of the incident pulse ($T_{pulse}$) and the time of reception of the echo ($T_{echo}$).

$$\tau=T_{echo}-T_{pulse} \quad (3)$$

For a stationary RF transmitter 210 and stationary RF receiver 220, the target bistatic Doppler frequency is given by:

$$f_D = \frac{2v}{c} * f_c * \cos\delta * \cos\left(\frac{\delta}{2}\right) \quad (4)$$

where v is the velocity of the target object 201, $f_c$ is the carrier frequency, $\beta$ is the difference between the angle of departure $\theta_T$ and the angle of arrival $\theta_R$, and $\delta$ is the angle between the velocity vector v and the angle $\beta$.

Because the RF transmitter 210 and the RF receiver 220 are implemented in (or correspond to) separate wireless communication devices, the RF transmitter 210 may need to communicate the timing of the transmission of the incident pulse $T_{pulse}$ to the RF receiver 220. However, because the RF transmitter 210 transmits pulses 212 in a number of directions, the RF transmitter 210 may be unaware as to which of the pulses 212 is incident on the target object 201. Accordingly, the RF transmitter 210 may need to communicate the timing of each of the pulses 212 to the RF receiver 220, and the RF receiver 220 may need to determine which of the pulses 212 resulted in the echo 222. In some implementations, the timing information ($T_{pulse}$) of the pulses 212 may be communicated to the RF receiver 220, e.g., as a resource configuration in assistance data.

In some implementations, the RF transmitter 210 also may determine ranging information regarding the target object 201. For example, the RF transmitter 210 may determine its relative distance R T to the target object 201. For example, in some aspects, the RF receiver 220 may provide feedback regarding the echo 222 to the RF transmitter 210. The feedback may include the timing of the echo $T_{echo}$, the timing of the transmitted pulse $T_{pulse}$, the time of flight $\tau$, the angle of arrival $\theta_R$, the calculated distance $R_R$, or any combination thereof. The RF transmitter 210 may then calculate the distance $R_T$ of the target object 201 based, at least in part, on the angle of departure $\theta_T$ of the incident pulse 212(i). For example, the RF transmitter 210 may calculate the distance $R_T$ by substituting the angle of departure $\theta_T$ for the angle of arrival $\theta_R$ in Equation 1. The RF transmitter 210 may determine the angle of departure $\theta_T$ based on the antenna sector (corresponding to a particular beam of a phased array antenna) used by the RF transmitter 210 to transmit the incident pulse 212(i).

In an RF sensing system, the sensing configuration may be embedded in data transmissions. For example, the network may schedule the sensing resource within the licensed band, e.g., in the same resource with separate waveforms or the same waveform, or using dedicated sensing resource that may be shared by multiple sensing UEs.

As discussed above, the RF transmitter 210 and/or RF receiver 220 may include an oscillator error. For example, oscillator errors may occur, particularly in UEs, which are not temperature controlled. The oscillator errors may introduce sizable errors in the generated frequency used for transmitting RF sensing signals or receiving RF sensing signals. Moreover, the errors may vary over time due to temperature fluctuations. Accordingly, a frequency offset of an RF sensing signal measured by the UE will include not only the Doppler shift induced by the target object but an oscillator error induced by the UE's oscillator. Similarly, the frequency offset of an RF sensing signal that was transmitted by a UE and measured by another device with a stable oscillator, such as a base station, will also include not only the Doppler shift induced by the target object but also the oscillator error induced by the UE's oscillator.

Figure 3B:
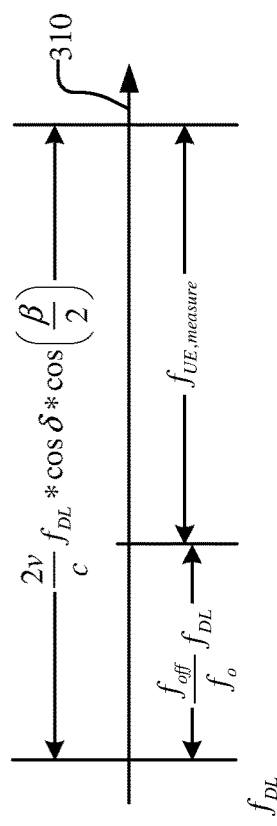
FIGS. 3B and 3C illustrate the frequency offset in downlink sensing signal and uplink sensing signal from FIG. 3A.
Figure 3C:
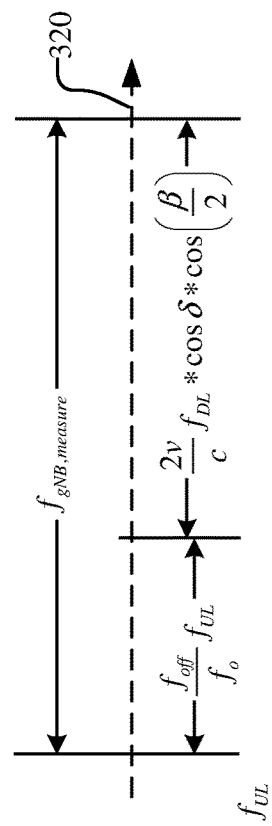
Figure 3A:
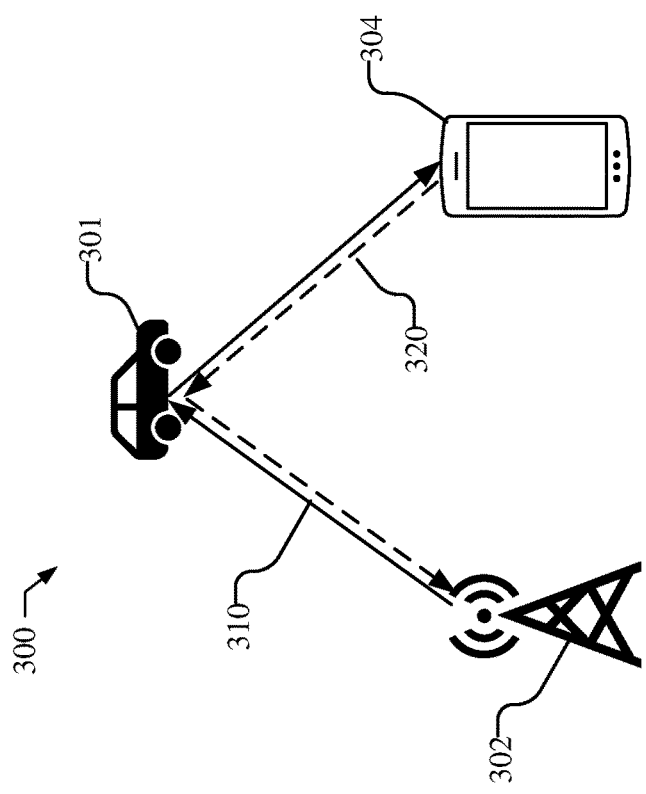
FIG. 3A illustrate an example of dual direction (downlink and uplink) bistatic sensing.

FIG. 3A, by way of example, illustrates a bistatic sensing system 300 that includes base station 302 and a UE 304 and a target object 301. As illustrated with the solid lines, the base station 302 may transmit an RF sensing signal 310 that is reflected by the target object 301 and the echo received by the UE 304. Further, as illustrated by the dotted lines, the UE 304 may transmit an RF sensing signal 320 that is reflected by the target object 301 and the echo received by the base station 302. The oscillator in the UE may induce an error the frequency offset in both the RF sensing signal 310 measured at the UE 304 and the RF sensing signal 320 measured at the base station 302.

As discussed herein, if the UE (or the device with the unstable oscillator) uses the same local oscillator for both transmission and reception of reference signals in a bistatic (or multi-static) sensing system, the target velocity component corresponding to bistatic Doppler shifts may be determined based on both the frequency offset for the RF sensing signal 310 measured at the UE 304 and the frequency offset for the RF sensing signal 320 measured at the base station 302.

As referenced in FIG. 2, the target velocity component that corresponds to the bistatic Doppler shifts ($v_D$) may be expressed as:

$$v_D = v \cos \delta * \cos\left(\frac{\beta}{2}\right). \quad (5)$$

Assuming that the UE 304 uses the same local oscillator for both transmission and reception of UL and DL RF sensing signals, respectively, the UE oscillator errors are given by:

$$\text{UE\_oscillator\_error\_DL\_direction\_}(Rx) = \frac{f_{off}}{f_o} f_{DL} \quad (6)$$

$$\text{UE\_oscillator\_error\_UL\_direction\_}(Tx) = \frac{f_{off}}{f_o} f_{UL} \quad (7)$$

where $f_{DL}$ is the downlink (DL) carrier frequency, $f_{UL}$ is the uplink (UL) carrier frequency, $f_o$ is the nominal frequency of the UE oscillator, and $f_{off}$ is the frequency offset of the UE oscillator.

FIGS. 3B and 3C illustrates the frequency offset in the DL RF sensing signal 310 and the UL RF sensing signal 320, respectively, assuming the oscillator error in the base station 302 is negligible. As illustrated, in FIG. 3B, the frequency offset ($f_{UE,measure}$) measured at the UE 304 plus the UE oscillator error in the DL direction $$\left(\frac{f_{off}}{f_o} f_{DL}\right)$$

is equal to the total frequency offset $$\left(\frac{2v}{c} f_{DL} * \cos \delta * \cos\left(\frac{\beta}{2}\right)\right)$$

for the DL sensing signal 310. Moreover, as illustrated, in FIG. 3C, the frequency offset ($f_{BS,measure}$) measured at the base station 302 is equal to the UE oscillator error in the UL direction $$\left(\frac{f_{off}}{f_o} f_{UL}\right)$$

plus the total frequency offset $$\left(\frac{2v}{c} f_{UL} * \cos \delta * \cos\left(\frac{\beta}{2}\right)\right)$$

for the UL sensing signal 320.

If the base station 302 oscillator offset is negligible, the normalized frequency offset measured by the UE 304 and the base station 302 may be expressed as illustrated in equations 8 and 9, respectively.

$$\frac{f_{UE,measure}}{f_{DL}} = \frac{2v}{c} \cos \delta * \cos\left(\frac{\beta}{2}\right) - \frac{f_{off}}{f_o} \quad (8)$$

$$\frac{f_{BS,measure}}{f_{UL}} = \frac{2v}{c} \cos \delta * \cos\left(\frac{\beta}{2}\right) + \frac{f_{off}}{f_o} \quad (9)$$

Accordingly, if the UE 304 uses the same local oscillator for both transmission and reception, the target velocity component of the target object 301 corresponding to bistatic Doppler shifts may be determined using both the frequency offset for the RF sensing signal 310 measured at the UE 304 and the frequency offset for the RF sensing signal 320 measured at the base station 302. For example, the target velocity component corresponding to bistatic doppler shifts may be determined by averaging the normalized frequency offset measured by the UE 304 and the base station 302, expressed as:

$$v \cos \delta * \cos\left(\frac{\beta}{2}\right) = \frac{c}{4}\left(\frac{f_{BS,measure}}{f_{UL}} + \frac{f_{UE,measure}}{f_{DL}}\right). \quad (10)$$

Thus, bistatic sensing system 300, the frequency offset that is due to oscillator error may be cancelled using a downlink (DL) and uplink (UL) (DL+UL) based bistatic sensing scheme, sometimes referred to herein as dual direction bistatic sensing. To enable oscillator offset cancellation, the dual direction based bistatic sensing scheme may be defined with following procedures. A first sensing entity (e.g., a base station 302) sends a first (e.g., DL) sensing signal to a second sensing entity (e.g., UE 304). The second sensing entity (e.g., UE 304) measures a first frequency offset (e.g., $f_{UE,measure}$), which is for the Doppler estimation. If desired, the second sensing entity (e.g., UE 304) may measure additional parameters, such as the differential delay, which is the Time of Arrival (ToA) difference between a line of sight (LOS) path and echo path. The second sensing entity (e.g., UE 304) sends a second (e.g., UL) sensing signal to the first sensing entity (e.g., the base station 302). The first sensing entity (e.g., the base station 302)) measures a second frequency offset ($f_{BS,measure}$) for the Doppler estimation. If desired, the first sensing entity (e.g., base station 302) may also measure additional parameters, such as the differential delay, i.e., the ToA difference between the LOS path and echo path. It should be understood that in some implementations, the first sensing entity may be the UE 304 and the second sensing entity may be the base station 302.

Several options are available for the velocity/range estimation using the dual direction based bistatic sensing scheme. For example, in one option, server-based sensing may be used in which the UE 304 reports the measured frequency offset $f_{UE,measure}$ (and any other measured parameters, such as differential delay) to a network server, such as sensing server 172 shown in FIG. 1, e.g., via a serving cell, and the base station 302 also reports its measured frequency offset $f_{BS,measure}$ (and any other measured parameters, such as differential delay) to the network server, and the network server determines the velocity estimate based on both frequency offsets, as well as optional range estimate based on one or both differential delays. In another option, base station based sensing may be used in which the UE 304 reports the measured frequency offset f UE,measure (and any other measured parameters, such as differential delay) to the base station 302, and the base station 302 determines the velocity estimate based on the UE measured frequency offset and the base station's own measured frequency offset $f_{BS,measure}$, and optionally determines a range estimate based on one or both of the UE measured and base station measured differential delays. In another option, UE based sensing may be used in which the base station 302 reports the measured frequency offset $f_{gNB,measure}$ (and any other measured parameters, such as differential delay) to the UE 304, and the UE 304 determines the velocity estimate based on the base station's measured frequency offset and the UE's own measured frequency offset $f_{UE,measure}$, and optionally determines a range estimate based on one or both of the UE measured and base station measured differential delays.

In some implementations, before the dual direction based bistatic sensing scheme is performed, the UE 304 (i.e., the sensing entity with oscillator errors) may indicate to the network (e.g., the base station 302 or network server, such as sensing server 172) whether the UE 304 uses the same local oscillator for both transmission and reception of sensing signals. For example, in one implementation, the UE 304 may provide an explicit indication that it uses the same local oscillator for both transmission and reception of sensing signals. In another implementation, the UE 304 may send a capabilities message indicating whether the UE 304 supports dual direction based bistatic sensing, which is an implicit indication that the UE uses the same local oscillator for both transmission and reception of sensing signals. The capability of the UE 304, e.g., an explicit or implicit indication of whether the UE 304 uses the same local oscillator, may be provided in response to a request from the base station 302 or sensing server 172, or may be sent without a request.

Advantageously, with the dual direction based bistatic sensing scheme, the UE 304 is not required report its local oscillator's normalized frequency error to the network (base station 302 or sensing server), which is difficult to estimate and distinguish from the Doppler shift.

The dual direction based bistatic sensing scheme may be extended to multi-static sensing, e.g., that may include multiple base stations and/or multiple UEs.

In some implementations, the DL sensing signal transmitted by the base station 302 and received by the UE 304 may be associated with TRP ID and resource ID, for example, as indicated in assistance data, and as reported by the UE 304, e.g., the UE 304 may report the measured frequency offset $f_{UE,measure}$ for a DL sensing signal with an indication of the associated TRP ID and resource ID. Similarly, the UL sensing signal may be associated with UE ID (and may be also associated with serving cell ID), for example, as indicated in assistance data, and as reported by the base station 302, e.g., the base station 302 may report the measured frequency offset $f_{BS,measure}$ for a UL sensing signal with an indication of the associated UE ID (and optionally the serving cell ID). Additionally, the DL sensing signal and the UL sensing signal may be associated with each other, e.g., in assistance data and reporting. The DL sensing signal and the UL sensing signal should be scheduled closely in time. For example, there may be a set requirement for resource allocation, e.g., a maximum gap in time between the DL sensing signal and UL sensing signal. Further, the dual direction based bistatic sensing scheme may be operated in frequency division duplex (FDD) and/or time division duplex (TDD) systems.

The measurement report from the UE 304 and/or the base station 302 may be, e.g., a per target-based measurement report or channel estimation-based measurement report. For a per target-based measurement report, the sensing entity, e.g., the UE 304 or base station 302, identifies the targets and includes in the measurement reports the target IDs associated with the measurements, e.g., the frequency offset. In some implementations, e.g., server-based sensing, the server may manage the measurement association with each target, or the base station 302 may manage the measurement association with each target before reporting them to the server. For example, for a group of resources, there may be multiple targets with different Doppler and range estimations. The server or serving base station may be responsible for compiling or identifying which set of measurements corresponds to which specific target. Different UEs and base stations may report measurements associated with a target ID, however, these measurements may be from different views of the target. Hence, the same target ID reported by different UEs or base stations may not mean the same physical target. Accordingly, the server or serving base station may need to associate the measurements and the targets. In an implementation such as UE or base station based sensing, the UE or base station may handle the measurement association with each target.

For a channel estimation-based measurement report, the UE 304 and/or base station 302 reports the channel estimation for advanced processing (such as machine learning (ML) based processing). The UE 304 and/or base station 302 may report the delay-Doppler based Channel Impulse Response (CIR) estimation (e.g., the x axis may be delay, the y axis may be Doppler, and the z axis may be the magnitude of the CIR). The UE 304 and/or base station 302 may report part of the delay-Doppler based CIR estimation to reduce the signaling overhead. For example, the report may include only the windowed delay-Doppler based CIR estimation to cover the targets.

Figure 4:
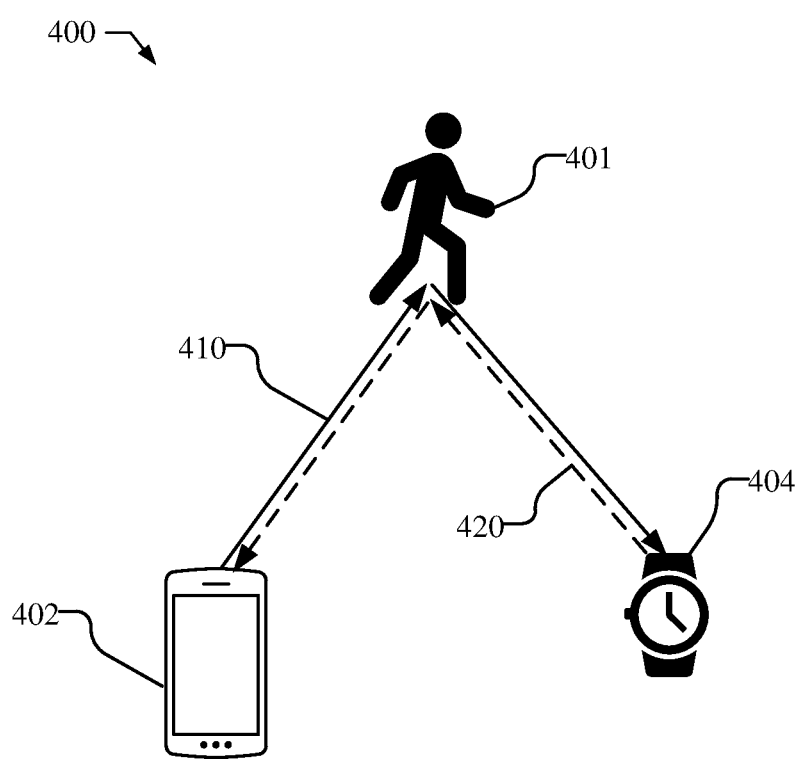
FIG. 4 illustrates an example of dual direction (sidelink and sidelink) bistatic sensing.

FIG. 4, by way of example, illustrates a dual direction bistatic sensing system 400 that is based on sidelink (SL)+ SL sensing transmissions between two UEs 402 and 404 that is reflected from a target object 401. As illustrated with the solid lines, a first UE 402 may transmit a SL sensing signal 410 that is reflected by the target object 401 and the echo received by the second UE 404. Additionally, as illustrated by the dotted lines, the second UE 304 may transmit a second SL sensing signal 420 that is reflected by the target object 401 and the echo received by the first UE 402.

A SL+SL based bistatic sensing scheme, similar to the dual direction based bistatic sensing scheme illustrated in FIG. 3A, may be used if one of the UEs (e.g., UE 402, which may be a premium UE) has much higher calibration capability in oscillator error estimation/compensation than the other UE (e.g., UE 404, which may be a reduced capability (RedCap) UE). The SL+SL based bistatic sensing scheme may be used to remove the impact of oscillator error in UE-UE bistatic sensing. Similar to the DL+UL based bistatic sensing scheme illustrated in FIG. 3A, one of the sensing entities, e.g., the (premium) UE 402 may request the other UE, e.g., UE 404, to indicate its calibration capability on oscillator error estimation/compensation. If the other UE (e.g. UE 404) indicates that it could calibrate its oscillator error, the single direction bistatic sensing may be used. If the other UE (e.g., UE 404) indicates that it could not calibrate its oscillator error, it may also indicate whether it use the same local oscillator for both transmission and reception, which may be either an explicit indication or implicit indication (to indicate whether it support the use of SL+SL based bistatic sensing. The procedure and measurement report for DL+UL based bistatic sensing scheme discussed in reference to FIG. 3A may be applied to the SL+SL case, e.g., with the (premium) UE (e.g., UE 402) taking the place of the base station 302 in the bistatic sensing scheme. The SL+SL based bistatic sensing scheme may also be generalized to multi-static sensing with multiple pair of UEs. Moreover, as discussed in reference to the DL+UL based bistatic sensing scheme, the two SL sensing signals should be scheduled closely in time.

Figure 5:
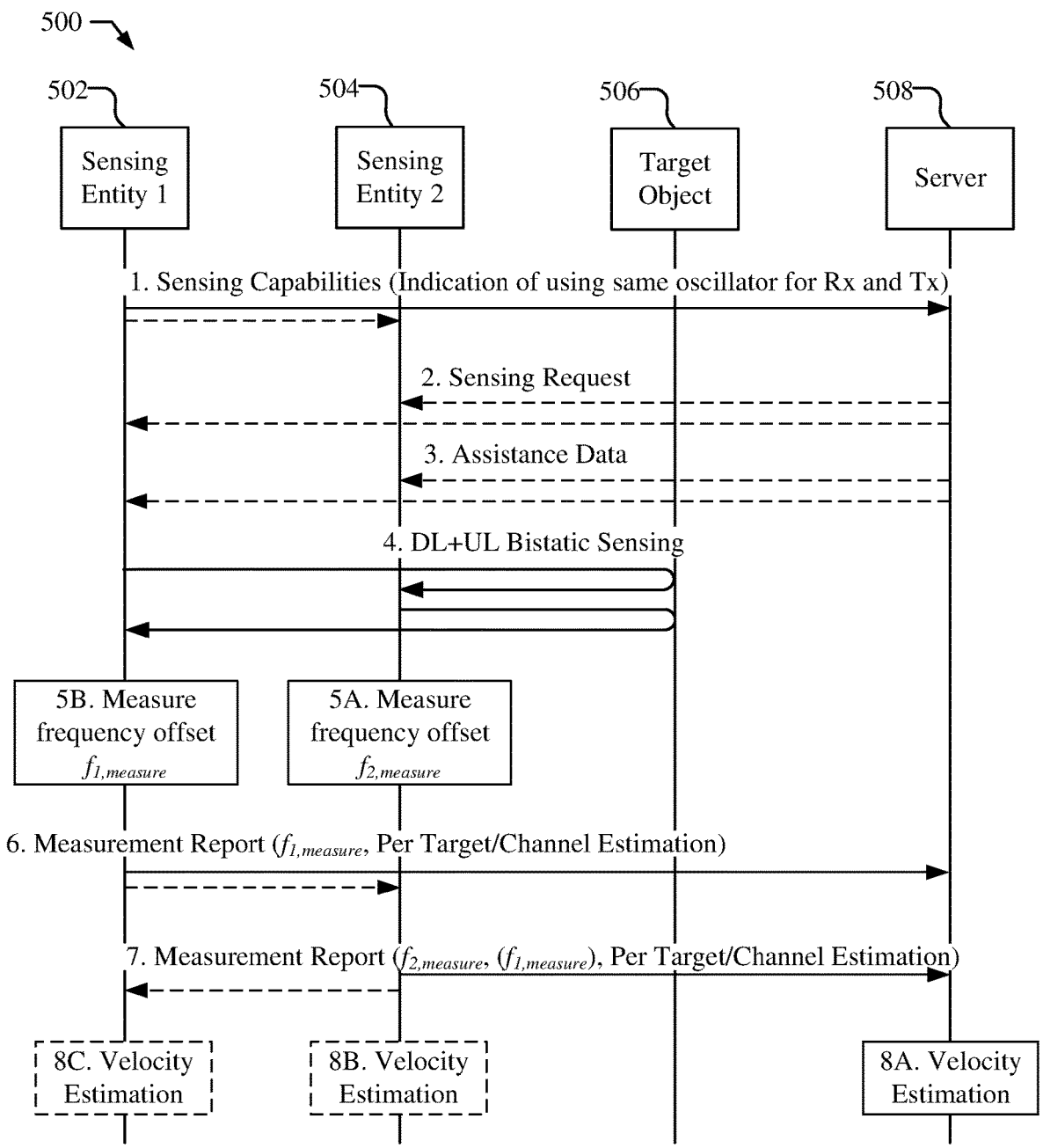
FIG. 5 illustrates a message flow for dual direction bistatic sensing illustrated with a first sensing entity, a second sensing entity, a target object, and a server.

FIG. 5 is a message flow 500 for dual direction bistatic sensing illustrated with a first sensing entity 502, a second sensing entity 504, a target object 506, and a server 508. The first sensing entity 502 includes an oscillator that produces oscillator errors in generated frequencies used to transmit and receive sensing signals. The first sensing entity 502, for example, may be a UE 104, UE 304, or UE 404. The sensing entity 504 includes one or more oscillators that produce negligible errors in generated frequencies used to transmit and receive sensing signals. The sensing entity 504, for example, may be a base station 102, base station 302, or UE 402. The server 508 may be a sensing server, such as server 172, shown in FIG. 1, or may be another entity in the sensing system, and may be located in the core network or RAN, or may not be present.

At stage 1, the first sensing entity 502 sends an indication of its sensing capabilities to the server 508 and/or the second sensing entity 504 (as indicated with the dotted arrow) including an indication that the first sensing entity 502 uses the same oscillator for transmitting sensing signals and receiving sensing signals. The indication may be an explicit indication that the same oscillator is used for transmission and reception of sensing signals or may be an implicit indication, e.g., in a capability message indicating that the first sensing entity 502 supports dual direction based bistatic RF sensing. In some implementations, the sensing capabilities sent by the first sensing entity 502 may be in response to a capabilities request received by the first sensing entity 502 from the server 508 or second sensing entity 504.

At stage 2, the server 508 may optionally send a dual direction based bistatic RF sensing request to the first sensing entity and the second sensing entity (as indicated with dotted arrows). The request, for example, may be sent by the server 508 in response to receiving an indication provided by from the first sensing entity 502 in stage 1 that the same oscillator is used for transmitting sensing signals and receiving sensing signals.

At stage 3, the server 508 may optionally send assistance data for the dual direction based bistatic RF sensing to the first sensing entity 502, the second sensing entity 504 or both. In some implementations, the assistance data from stage 3 may be sent before or with the sensing request in stage 2. The assistance data, for example, may associate the sensing signals to be sent by the first sensing entity 502 and/or the second sensing entity 504 with identifying data, e.g., the sensing signal to be sent by the first sensing entity 502 may be associated with a UE identifier and the sensing signal to be sent by the second sensing entity 504 may be associated with a TRP identifier and a resource identifier if the second sensing entity 504 is TRP or with a UE identifier if the second sensing entity 504 is a UE. In some implementations, the sensing signals to be sent by the first sensing entity 502 and/or the second sensing entity 504 may be associated with each other. In some implementations, the sensing signals to be sent by the first sensing entity 502 and/or the second sensing entity 504 may be scheduled to be transmitted within a predetermined amount of time of each other.

At stage 4, the first sensing entity 502 may transmit a first sensing signal that is reflected by the target object 506 and the echo is received by the second sensing entity 504. The second sensing entity 504 may transmit a second sensing signal that is reflected by the target object 506 and the echo is received by the first sensing entity 502. In some implementations, the second sensing entity 504 may transmit its sensing signal before the first sensing entity 502 transmits its sensing signal. The first sensing signal and the second sensing signal may be transmitted within a predetermined amount of time of each other.

At stages 5A and 5B, the second sensing entity 504 measures a first frequency offset ($f_{2,measure}$) of the first sensing signal received in stage 4 and the first sensing entity 502 measures a second frequency offset ($f_{1,measure}$) of the second sensing signal received in stage 4. As discussed in FIGS. 3A, 3B, and 3C, the first frequency offset ($f_{2,measure}$) of the first sensing signal determined in stage 5A includes a first oscillator error due to transmission of the first sensing signal by the first sensing entity 502, as well as the Doppler shift caused by the velocity of the target object. Additionally, the second frequency offset ($f_{1,measure}$) of the second sensing signal determined in stage 5B includes a second oscillator error due to reception of the second sensing signal by the first sensing entity 502, as well as the Doppler shift caused by the velocity of the target object. In some implementations, additional parameters may be measured in stages 5A and 5B, such as the differential delay, e.g., the ToA difference between a line of sight (LOS) path and echo path.

At stage 6, the first sensing entity 502 may send a measurement report to the second sensing entity 504 (if the second sensing entity 502 is to determine the velocity estimation) or to a server 508, e.g., via a serving base station, which may be the second sensing entity 504. The measurement report includes the second frequency offset ($f_{2,measure}$) measured by the first sensing entity 502. In one implementation, the measurement report may identify the target object 506 associated with the second frequency offset. In one implementation, the measurement report may report a channel estimation associated with the second frequency offset. For example, the first sensing entity 502 may report the delay-Doppler based CIR estimation (e.g., the x axis may be delay, the y axis may be Doppler, and the z axis may be the magnitude of the CIR), which may be reported as a windowed delay-Doppler based CIR estimation that covers the target object 506. The measurement report may associate the second sensing signal used to generate the second frequency offset with identifying data, such as a TRP identifier and a resource identifier if the second sensing entity 504 is TRP or with a UE identifier if the second sensing entity 504 is a UE. In some implementations, the measurement report may associate the second sensing signal used to generate the second frequency offset with the first sensing signal.

At stage 7, the second sensing entity 504 may optionally send a measurement report to the server 508 or to the first sensing entity 502 (if the first sensing entity 502 is to determine the velocity estimation). The measurement report includes the first frequency offset ($f_{1,measure}$) measured by the second sensing entity 502, and in some implementations may include the second frequency offset ($f_{2,measure}$) if received from the first sensing entity 502. In one implementation, the measurement report may identify the target object 506 associated with the first frequency offset. In one implementation, the measurement report may report a channel estimation associated with the first frequency offset. For example, the second sensing entity 504 may report the delay-Doppler based CIR estimation (e.g., the x axis may be delay, the y axis may be Doppler, and the z axis may be the magnitude of the CIR), which may be reported as a windowed delay-Doppler based CIR estimation that covers the target object 506. The measurement report may associate the first sensing signal used to generate the first frequency offset with identifying data, such as the UE identifier for the first sensing entity 502. In some implementations, the measurement report may associate the first sensing signal used to generate the first frequency offset with the second sensing signal.

At stage 8A, the server 508 may estimate a velocity of the target object 506 based on both the second frequency offset measurement and the first frequency offset measurement if received from the first sensing entity 502 and the second sensing entity 504 in stages 6 and 7. As discussed in reference to FIGS. 3A, 3B, and 3C the estimate of the velocity of the target object 506 includes cancelling the first oscillator error and the second oscillator error generated in the frequency offset determination in stages 5A and 5B. For example, as discussed above, the estimate of the velocity may be determined by averaging a normalized first frequency offset and a normalized second frequency offset.

At stage 8B, the second sensing entity 504 may estimate a velocity of the target object 506 based on both the first frequency offset measurement generated by the second sensing entity 504 in stage 5A and the second frequency offset if received from the first sensing entity 502 in stages 6. If the second sensing entity 504 determines the estimate of the velocity of the target object 506, stage 7 may be obviated. As discussed in reference to FIGS. 3A, 3B, and 3C the estimate of the velocity of the target object 506 includes cancelling the first oscillator error and the second oscillator error generated in the frequency offset determination in stages 5A and 5B. For example, as discussed above, the estimate of the velocity may be determined by averaging a normalized first frequency offset and a normalized second frequency offset.

At stage 8C, the first sensing entity 502 may estimate a velocity of the target object 506 based on both the second frequency offset measurement generated by the first sensing entity 502 in stage 5B and the first frequency offset if received from the second sensing entity 504 in stages 7. If the first sensing entity 502 determines the estimate of the velocity of the target object 506, stage 6 may be obviated. As discussed in reference to FIGS. 3A, 3B, and 3C the estimate of the velocity of the target object 506 includes cancelling the first oscillator error and the second oscillator error generated in the frequency offset determination in stages 5A and 5B. For example, as discussed above, the estimate of the velocity may be determined by averaging a normalized first frequency offset and a normalized second frequency offset.

Figure 6:
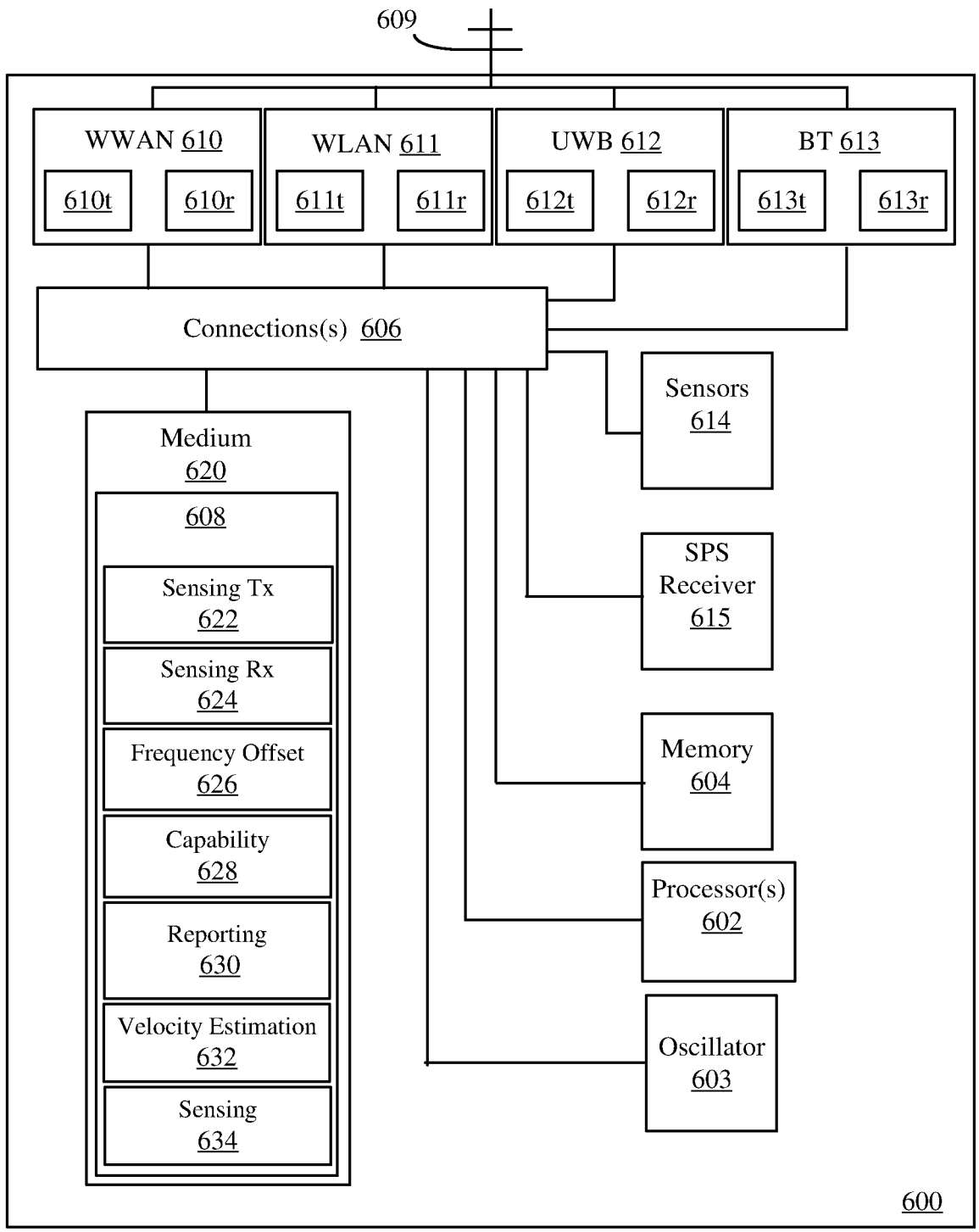
FIG. 6 illustrates a schematic block diagram for certain exemplary features of a sensing entity that supports dual direction bistatic RF sensing.

FIG. 6 shows a schematic block diagram illustrating certain exemplary features of a sensing entity 600, e.g., which may be UE 104 or base station 102 shown in FIG. 1, or any of the sensing nodes 210, 220, 302, 304, 402 404, 502, or 504 shown in FIGS. 2, 3A, 4, and 5, respectively, and supports dual direction bistatic RF sensing, as described herein. The sensing entity 600, for example, may perform the message flow 500 shown in FIG. 5, and the process flows 800 and 900 shown in FIGS. 8 and 9 and accompanying techniques as discussed herein. The sensing entity 600 may include, for example, one or more processors 602, memory 604, an external interface such as at least one wireless transceivers (e.g., wireless network interface) illustrated as WWAN transceiver 610, WLAN transceiver 611, an Ultra-Wideband (UWB) transceiver 612 and a Bluetooth (BT) transceiver 613, SPS receiver 615, and one or more sensors 614, which may be operatively coupled with one or more connections 606 (e.g., buses, lines, fibers, links, etc.) to non-transitory computer readable medium 620 and memory 604. The SPS receiver 615, for example, may receive and process SPS signals from satellite vehicles. The one or more sensors 614, for example, may be an inertial measurement unit (IMU) that may include one or more accelerometers, one or more gyroscopes, a magnetometer, etc. The sensing entity 600 may further include additional items, which are not shown, such as a user interface that may include e.g., a display, a keypad or other input device, such as virtual keypad on the display, through which a user may interface with the sensing node. In certain example implementations, all or part of sensing entity 600 may take the form of a chipset, and/or the like.

The sensing entity 600 may include at least one wireless transceiver, such as wireless transceiver 610 for a WWAN communication system and wireless transceiver 611 for a WLAN communication system, UWB transceiver 612 for a UWB communication system, BT transceiver 613 for a Bluetooth communication system, or a combined transceiver for any of WWAN, WLAN, UWB, and BT. The WWAN transceiver 610 may include a transmitter 610t and receiver 610r coupled to one or more antennas 609 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 611 may include a transmitter 611t and receiver 611r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The UWB transceiver 612 may include a transmitter 612t and receiver 612r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The BT transceiver 613 may include a transmitter 613t and receiver 613r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 610*t*, 611*t*, 612*t*, and 613*t* may include multiple transmitters that may be discrete components or combined/integrated components, and/or the receivers 610*r*, 611*r*, 612*r*, and 613*r* may include multiple receivers that may be discrete components or combined/integrated components. The WWAN transceiver 610 may be configured to communicate signals (e.g., with base stations and/or one or more other devices) according to a variety of radio access technologies (RATs) such as 6G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 611 may be configured to communicate signals (e.g., with access points and/or one or more other devices) according to a variety of radio access technologies (RATs) such as 3GPP LTE-V2X (PC5), IEEE 602.11 (including IEEE 602.11p), WiFi, WiFi Direct (WiFi-D), Zigbee etc. The UWB transceiver 612 may be configured to communicate signals (e.g., with access points and/or one or more other devices) according to a variety of radio access technologies (RATs) such as personal area network (PAN) including IEEE 802.15.3, IEEE 802.15.4, etc. The BT transceiver 613 may be configured to communicate signals (e.g., with access points and/or one or more other devices) according to a variety of radio access technologies (RATs) such as a Bluetooth® network. The transceivers 610 611, 612, and 613 may be communicatively coupled to a transceiver interface, e.g., by optical and/or electrical connection, which may be at least partially integrated with the transceivers 610, 611, 612, 613.

The sensing entity 600 is illustrated with an oscillator 603, which may be part of one or more of the transceivers, e.g., transceiver 610, 611, 612, or 613. In some implementations, e.g., when the sensing entity 600 is UE 304 or 404, shown in FIGS. 3A and 4, the oscillator 603 may produce oscillator errors that introduce errors in frequencies used for transmitting or receiving sensing signals with transceiver 610, 611, 612, or 613, and the oscillator 603 may be used for both transmission and reception of sensing signals. In other implementations, e.g., when the sensing entity 600 is base station 302 or UE 402, the oscillator 603 may be stable and may produce only negligible errors in generated frequencies.

In some embodiments, sensing entity 600 may include antenna 609, which may be internal or external. sensing node antenna 609 may be used to transmit and/or receive signals processed by wireless transceivers 610, 611, 612, 613. In some embodiments, sensing node antenna 609 may be coupled to wireless transceivers 610, 611, 612, 613. In some embodiments, measurements of signals received (transmitted) by sensing entity 600 may be performed at the point of connection of the sensing node antenna 609 and wireless transceivers 610, 611, 612, 613. For example, the measurement point of reference for received (transmitted) RF signal measurements may be an input (output) sensing node of the receiver 610*r* (transmitter 610*t*) and an output (input) sensing node of the sensing node antenna 609. In a sensing entity 600 with multiple sensing node antennas 609 or antenna arrays, the antenna connector may be viewed as a virtual point representing the aggregate output (input) of multiple sensing node antennas.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of sensing entity 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in sensing entity 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in sensing entity 600 is merely exemplary, and as such the functionality of the modules and/or data structures may be combined, separated, and/or be structured in different ways depending upon the implementation of the sensing entity 600.

The medium 620 and/or memory 604 may include a sensing transmit (Tx) module 622 that when implemented by the one or more processors 602 configures the one or more processors 602 to transmit, via the external interface including one or more of wireless transceivers 610, 611, 612, and 613, a sensing signal to be reflected by a target object and received by a second sensing entity as discussed herein, including in FIGS. 3A, 4, and 5.

The medium 620 and/or memory 604 may include a sensing receive (Rx) module 624 that when implemented by the one or more processors 602 configures the one or more processors 602 to receive, via the external interface including one or more of wireless transceivers 610, 611, 612, and 613, a sensing signal that is transmitted by the second sensing entity and reflected by the target object as discussed herein, including in FIGS. 3A, 4, and 5.

The medium 620 and/or memory 604 may include a frequency offset module 626 that when implemented by the one or more processors 602 configures the one or more processors 602 to measure a frequency offset of the received sensing signal as discussed herein, including in FIGS. 3A, 4, and 5.

The medium 620 and/or memory 604 may include a capability module 628 that when implemented by the one or more processors 602 configures the one or more processors 602 to send, via the external interface including one or more of wireless transceivers 610, 611, 612, and 613, an indication to another entity, such as another sensing entity or a server, that a same oscillator, e.g., oscillator 603, is used for transmitting sensing signals and receiving sensing signals, as discussed herein, including in FIGS. 3A, 4, and 5. The indication may be an explicit indication or a capability message indicating support of dual direction bistatic RF sensing.

The medium 620 and/or memory 604 may include a reporting module 630 that when implemented by the one or more processors 602 configures the one or more processors 602 to send a report, e.g., via the external interface including one or more of wireless transceivers 610, 611, 612, and 613, to another entity, such as another sensing entity or a server, with the measured frequency offset, as discussed herein, including in FIGS. 3A, 4, and 5. The report may identify the target object associated with the second frequency offset or report a channel estimation associated with the second frequency offset, as discussed herein. The report may associate the received sensing signal with a TRP identifier and a resource identifier and/or the transmitted sensing signal with the UE ID, or may associate the received signal with the transmitted signal. In some implementations, the one or more processors 602 may be configured to receive a report, e.g., via the external interface including one or more of wireless transceivers 610, 611, 612, and 613, from another sensing entity, with a frequency offset measured by the other sensing entity, as discussed herein, including in FIGS. 3A, 4, and 5.

The medium 620 and/or memory 604 may include a velocity estimation module 632 that when implemented by the one or more processors 602 configures the one or more processors 602 to determine an estimate of the velocity of the target object based on both the frequency offset measured for the received sensing signal by the sensing entity 600 and a frequency offset measured for the transmitted sensing signal by another sensing entity, as discussed herein, including in FIGS. 3A, 4, and 5. The one or more processors 602, for example, may be configured to average a normalized first frequency offset and a normalized second frequency offset in the determination of the velocity estimate as discussed herein.

The medium 620 and/or memory 604 may include a sensing module 634 that when implemented by the one or more processors 602 configures the one or more processors 602 to receive, via the external interface including one or more of wireless transceivers 610, 611, 612, and 613, a dual direction bistatic RF sensing request from a server. The one or more processors 602 may be further configured to receive, via the external interface 610, assistance data to one or more sensing entities, including an association between the sensing signals and a UE identifier and/or a TRP identifier and a resource identifier, an association of sensing signals sent by different sensing entities, a scheduled for the sensing signals to be transmitted within a predetermined amount of time of each other, or a combination thereof.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support sensing using dual direction bistatic RF sensing in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface including one or more of wireless transceivers 610, 611, 612, and 613 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
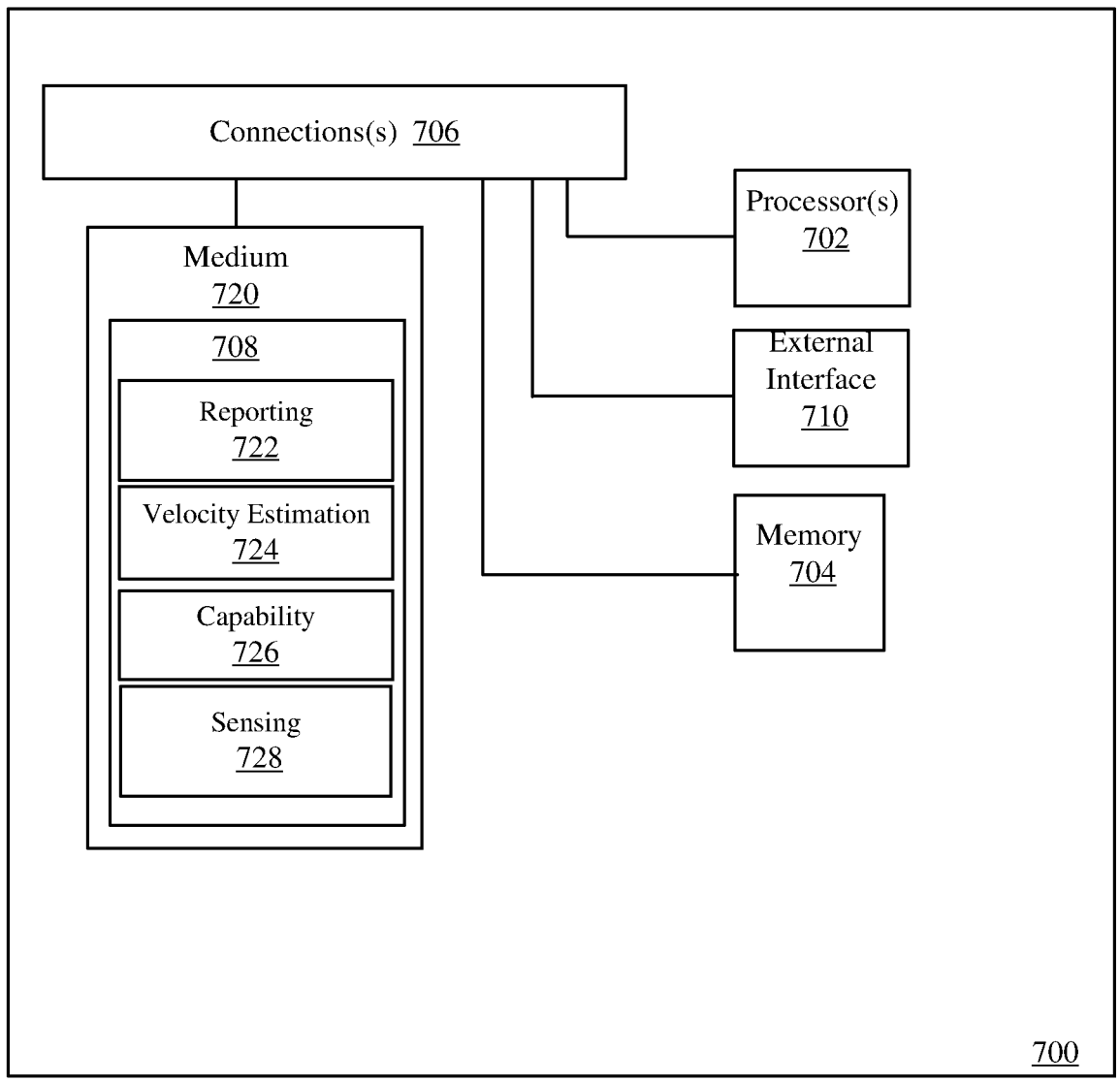
FIG. 7 illustrates a schematic block diagram for certain exemplary features of a server that supports dual direction bistatic RF sensing.

FIG. 7 shows a schematic block diagram illustrating certain exemplary features of a server 700, which may be, e.g., the sensing server 172 in FIG. 1, or server 508 in FIG. 5, and supports dual direction bistatic RF sensing by sensing entities, such as a UE or base station, as described herein. The server 700, for example, may perform the message flow 500 shown in FIG. 5 and the process flow 900 shown in FIG. 9 and accompanying techniques as discussed herein. The server 700 may include, for example, one or more processors 702 and memory 704, an external interface 710, which may be operatively coupled with one or more connections 706 (e.g., buses, lines, fibers, links, etc.) to non-transitory computer readable medium 720 and memory 704. The external interface 710 may be a wired and/or wireless interface capable of connecting to network entities in the core network 170, through which the server 700 may communicate with sensing entities, such as UEs or base stations, or if the network node is, e.g., a base station, the external interface 710 may be wireless transceiver configured to communicate signals (e.g., with sensing nodes) according to a variety of radio access technologies (RATs). The server 700 may further include additional items, which are not shown, such as a user interface that may include e.g., a display, a keypad or other input device, such as virtual keypad on the display, through which a user may interface with the network node. In certain example implementations, all or part of server 700 may take the form of a chipset, and/or the like.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of server 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in server 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in server 700 is merely exemplary, and as such the functionality of the modules and/or data structures may be combined, separated, and/or be structured in different ways depending upon the implementation of the server 700.

The medium 720 and/or memory 704 may include reporting module 722 that when implemented by the one or more processors 702 configures the one or more processors 702 to receive, via the external interface 710, frequency offsets of sensing signals measured by sensing entities, as discussed herein, including in FIGS. 3A, 4, and 5. The report may identify the target object associated with the second frequency offset or report a channel estimation associated with the second frequency offset, as discussed herein. The report may associate the received sensing signal with a TRP identifier and a resource identifier and/or the transmitted sensing signal with the UE ID, or may associate the received signal with the transmitted signal.

The medium 720 and/or memory 704 may include a velocity estimation module 724 that when implemented by the one or more processors 702 configures the one or more processors 702 to determine an estimate of the velocity of the target object based on both a first frequency offset measurement from a first sensing entity and a second frequency offset measurement from a second sensing entity, as discussed herein, including in FIGS. 3A, 4, and 5. The one or more processors 702, for example, may be configured to average a normalized first frequency offset and a normalized second frequency offset in the determination of the velocity estimate as discussed herein The medium 720 and/or memory 704 may include a capability module 726 that when implemented by the one or more processors 702 configures the one or more processors 702 to receive, via the external interface 710, an indication from a sensing entity that a same oscillator is used for transmitting and receiving sensing signals and receiving sensing signals, as discussed herein, including in FIGS. 3A, 4, and 5. The indication may be an explicit indication or a capability message indicating support of dual direction bistatic RF sensing.

The medium 720 and/or memory 704 may include a sensing module 728 that when implemented by the one or more processors 702 configures the one or more processors 702 to send, via the external interface 710, a dual direction bistatic RF sensing request to the sensing entities. The one or more processors 702 may be further configured to send, via the external interface 710, assistance data to one or more sensing entities, including an association between the sensing signals and a UE identifier and/or a TRP identifier and a resource identifier, an association of sensing signals sent by different sensing entities, a scheduled for the sensing signals to be transmitted within a predetermined amount of time of each other, or a combination thereof.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support sensing by a sensing node in a wireless network using a preconfigured resource set in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include the external interface 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
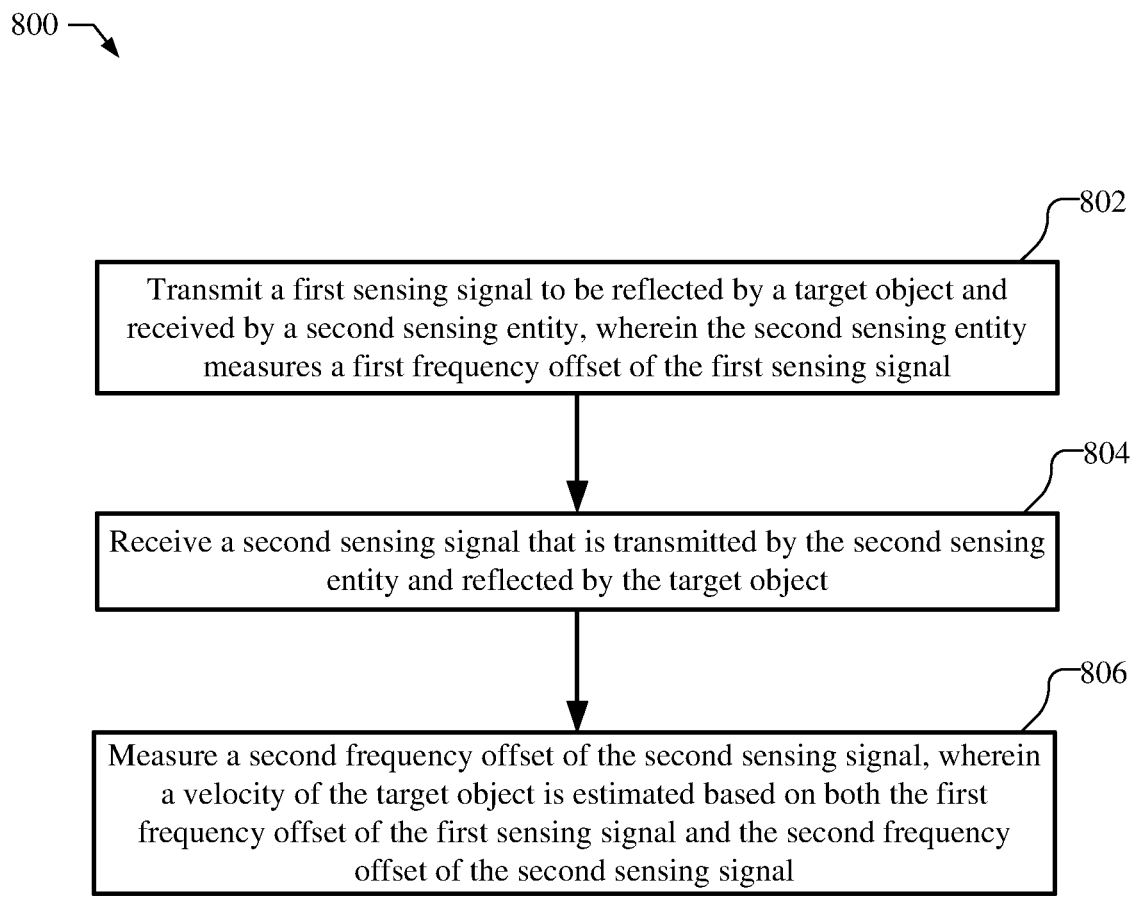
FIG. 8 is a flow chart illustrating a method for supporting dual direction bistatic RF sensing in a wireless network performed by a sensing entity.

FIG. 8 is a flow chart illustrating a method 800 for supporting dual direction bistatic RF sensing in a wireless network, performed by a first sensing entity, such as a UE 104 or base station 102 shown in FIG. 1, UE 304 or base station 302 shown in FIG. 3, UE 404 or UE 402 shown in FIG. 4, first sensing entity 502 or second sensing entity 504 shown in FIG. 5, or sensing entity 600 shown in FIG. 6, as described herein.

At block 802, the first sensing entity transmits a first sensing signal to be reflected by a target object and received by a second sensing entity, wherein the second sensing entity measures a first frequency offset of the first sensing signal, e.g., as described in stages 4, and 5A or 5B of FIG. 5. The second sensing entity, for example, may be UE 104 or base station 102 shown in FIG. 1, UE 304 or base station 302 shown in FIG. 3, UE 404 or UE 402 shown in FIG. 4, first sensing entity 502 or second sensing entity 504 shown in FIG. 5, or sensing entity 600 shown in FIG. 6, as described herein. A means for transmitting a first sensing signal to be reflected by a target object and received by a second sensing entity, wherein the second sensing entity measures a first frequency offset of the first sensing signal may include the external interface including one or more of wireless transceivers 610, 611, 612, and 613, along with one or more processors 602 with dedicated hardware or implementing executable code or software instructions in memory 604 and/or medium 620 in sensing entity 600, such as the sensing Tx module 622, shown in FIG. 6.

At block 804, the first sensing entity receives a second sensing signal that is transmitted by the second sensing entity and reflected by the target object, e.g., as described in stage 4 of FIG. 5. A means for receiving a second sensing signal that is transmitted by the second sensing entity and reflected by the target object may include the external interface including one or more of wireless transceivers 610, 611, 612, and 613, along with one or more processors 602 with dedicated hardware or implementing executable code or software instructions in memory 604 and/or medium 620 in sensing entity 600, such as the sensing Rx module 624, shown in FIG. 6.

At block 806, the first sensing entity measures a second frequency offset of the second sensing signal, wherein a velocity of the target object is estimated based on both the first frequency offset of the first sensing signal and the second frequency offset of the second sensing signal, e.g., as described in reference to FIGS. 3A-3C and stages 5A or 5B and stages 8A, 8B, or 8C of FIG. 5. A means for measuring a second frequency offset of the second sensing signal, wherein a velocity of the target object is estimated based on both the first frequency offset of the first sensing signal and the second frequency offset of the second sensing signal may include the external interface including one or more of wireless transceivers 610, 611, 612, and 613, along with one or more processors 602 with dedicated hardware or implementing executable code or software instructions in memory 604 and/or medium 620 in sensing entity 600, such as the frequency offset module 626, shown in FIG. 6.

In one implementation, the first sensing entity may send an indication to the second sensing entity or a server that a same oscillator is used for transmitting sensing signals and receiving sensing signals, e.g., as described in stage 1 of FIG. 5. The indication that the same oscillator is used for transmitting sensing signals and receiving sensing signals, for example, may comprises an explicit indication or a capability message indicating support of downlink and uplink based bistatic RF sensing. A means for sending an indication to the second sensing entity or a server that a same oscillator is used for transmitting sensing signals and receiving sensing signals may include the external interface including one or more of wireless transceivers 610, 611, 612, and 613, along with one or more processors 602 with dedicated hardware or implementing executable code or software instructions in memory 604 and/or medium 620 in sensing entity 600, such as the capability module 628, shown in FIG. 6.

In one implementation, the first sensing entity uses an oscillator that produces an oscillator error in generated frequencies used for transmitting the first sensing signal and receiving the second sensing signal, e.g., as discussed in reference to FIGS. 3A-3C, 4, and 5. The first sensing entity, for example, may be a user equipment (UE), such as UE 304 or 404, and the second sensing entity is one of a base station, such as base station 302, or another UE, such as UE 402. In one example, the first frequency offset of the first sensing signal may include a first oscillator error from transmitting of the first sensing signal and a first Doppler shift caused by the velocity of the target object, and the second frequency offset may include a second oscillator error from receiving the second sensing signal and a second Doppler shift caused by the velocity of the target object, and a determination of the velocity of the target object estimated based on both the first frequency offset of the first sensing signal and the second frequency offset of the second sensing signal includes cancelling the first oscillator error and the second oscillator error, e.g., as discussed in reference to FIGS. 3A-3C, and stages 8A, 8B, and 8C of FIG. 5.

In one implementation, the second sensing entity uses an oscillator that produces an oscillator error in generated frequencies used to receive the first sensing signal by the second sensing entity and to transmit the second sensing signal by the second sensing entity, e.g., as discussed in reference to FIGS. 3A-3C, and FIG. 5. The second sensing entity, for example, may be a user equipment (UE), such as UE 304 or 404, and the first sensing entity is one of a base station, such as base station 302, or another UE, such as UE 402. In one example, the first frequency offset of the first sensing signal may include a first oscillator error from the second sensing entity receiving the first sensing signal and a first Doppler shift caused by the velocity of the target object, and the second frequency offset may include a second oscillator error from the second sensing entity transmitting the second sensing signal and a second Doppler shift caused by the velocity of the target object, and a determination of the velocity of the target object estimated based on both the first frequency offset of the first sensing signal and the second frequency offset of the second sensing signal includes cancelling the first oscillator error and the second oscillator error, e.g., as discussed in reference to FIGS. 3A-3C, and stages 8A, 8B, and 8C of FIG. 5.

In one implementation, the first sensing entity may be a user equipment (UE) and the second sensing entity may be a transmission reception point (TRP), and the first sensing signal is associated with a UE identifier and the second sensing signal is associated with a TRP identifier and a resource identifier in assistance data received by the first sensing entity, e.g., as discussed in stage 3 of FIG. 5.

In one implementation, the first sensing signal is associated with the second sensing signal in at least one of assistance data received by the first sensing entity or a measurement report transmitted by the first sensing entity, e.g., as discussed in stages 3, 6 and 7 of FIG. 5.

In one implementation, the first sensing signal and the second sensing signal are scheduled to be transmitted within a predetermined amount of time of each other, e.g., as discussed in stages 3 and 4 of FIG. 5.

In one implementation, the first sensing entity may send a measurement report to the second sensing entity or a server, e.g., as discussed in stages 6 and 7 of FIG. 5. The measurement report may identify the target object associated with the second frequency offset or reports a channel estimation associated with the second frequency offset, e.g., as discussed in stages 6 and 7 of FIG. 5. A means for sending a measurement report to the second sensing entity or a server may include the external interface including one or more of wireless transceivers 610, 611, 612, and 613, along with one or more processors 602 with dedicated hardware or implementing executable code or software instructions in memory 604 and/or medium 620 in sensing entity 600, such as the reporting module 630, shown in FIG. 6.

In one implementation, the first sensing entity may receive a measurement report from the second sensing entity with the first frequency offset measured by the second sensing entity, e.g., as discussed in stages 6 and 7 of FIG. 5. The first sensing entity may further estimate the velocity of the target object based on both the first frequency offset of the first sensing signal and the second frequency offset of the second sensing signal, e.g., as discussed in stages 8B or 8C of FIG. 5. A means for receiving a measurement report from the second sensing entity with the first frequency offset measured by the second sensing entity may include the external interface including one or more of wireless transceivers 610, 611, 612, and 613, along with one or more processors 602 with dedicated hardware or implementing executable code or software instructions in memory 604 and/or medium 620 in sensing entity 600, such as the reporting module 630, shown in FIG. 6. A means for estimating the velocity of the target object based on both the first frequency offset of the first sensing signal and the second frequency offset of the second sensing signal may include one or more processors 602 with dedicated hardware or implementing executable code or software instructions in memory 604 and/or medium 620 in sensing entity 600, such as the velocity estimation module 632, shown in FIG. 6.

Figure 9:
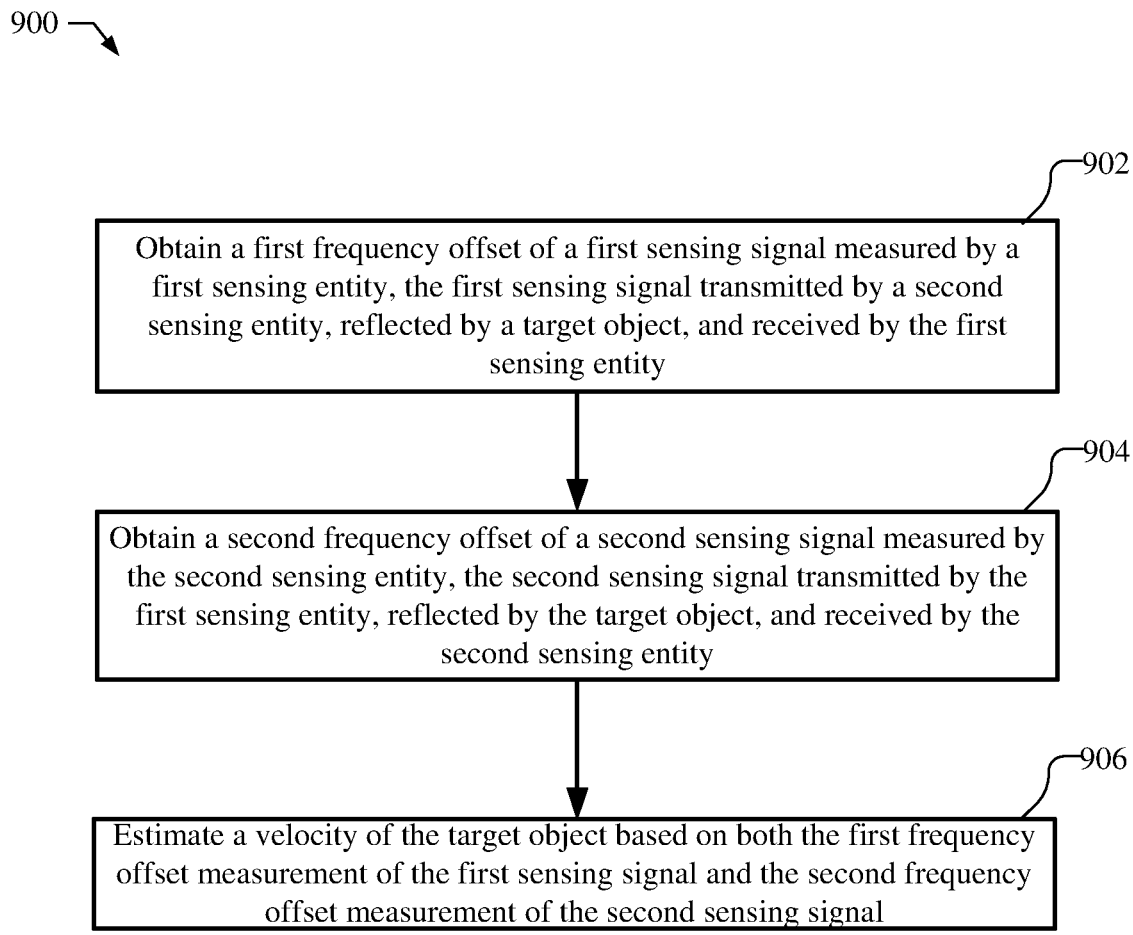
FIG. 9 is a flow chart illustrating a method for supporting dual direction bistatic RF sensing in a wireless network performed by a server or a sensing entity.

FIG. 9 is a flow chart illustrating a method 900 for supporting dual direction bistatic RF sensing performed by a first entity in a wireless network, such as a sensing server 172, UE 104, or base station 102 shown in FIG. 1, UE 304 or base station 302 shown in FIG. 3, UE 404 or UE 402 shown in FIG. 4, first sensing entity 502, second sensing entity 504, or server 508 shown in FIG. 5, sensing entity 600 shown in FIG. 6, or server 700 shown in FIG. 7.

At block 902, the first entity obtains a first frequency offset of a first sensing signal measured by a first sensing entity, the first sensing signal transmitted by a second sensing entity, reflected by a target object, and received by the first sensing entity, e.g., as described in stages 4, 5A, 5B, 6 and 7 of FIG. 5. A means for obtaining a first frequency offset of a first sensing signal measured by a first sensing entity, the first sensing signal transmitted by a second sensing entity, reflected by a target object, and received by the first sensing entity may include the one or more of wireless transceivers 610, 611, 612, and 613, along with one or more processors 602 with dedicated hardware or implementing executable code or software instructions in memory 604 and/or medium 620 in sensing entity 600, such as the frequency offset module 626 or reporting module 630, shown in FIG. 6, or the external interface 710, along with one or more processors 702 with dedicated hardware or implementing executable code or software instructions in memory 704 and/or medium 720 in server 700, such as the reporting module 722, shown in FIG. 7.

At block 904, the first entity obtains a second frequency offset of a second sensing signal measured by the second sensing entity, the second sensing signal transmitted by the first sensing entity, reflected by the target object, and received by the second sensing entity, e.g., as described in stages 4, 5A, 5B, 6 and 7 of FIG. 5. A means for obtaining a second frequency offset of a second sensing signal measured by the second sensing entity, the second sensing signal transmitted by the first sensing entity, reflected by the target object, and received by the second sensing entity may include the one or more of wireless transceivers 610, 611, 612, and 613, along with one or more processors 602 with dedicated hardware or implementing executable code or software instructions in memory 604 and/or medium 620 in sensing entity 600, such as the frequency offset module 626 or reporting module 630, shown in FIG. 6, the external interface 710, along with one or more processors 702 with dedicated hardware or implementing executable code or software instructions in memory 704 and/or medium 720 in server 700, such as the reporting module 722, shown in FIG. 7.

At block 906, the first entity estimates a velocity of the target object based on both the first frequency offset measurement of the first sensing signal and the second frequency offset measurement of the second sensing signal, e.g., as described in stages 8A, 8B, or 8C of FIG. 5. A means for estimating a velocity of the target object based on both the first frequency offset measurement of the first sensing signal and the second frequency offset measurement of the second sensing signal may include may include one or more processors 602 with dedicated hardware or implementing executable code or software instructions in memory 604 and/or medium 620 in sensing entity 600, such as the velocity estimation module 632, shown in FIG. 6, or one or more processors 702 with dedicated hardware or implementing executable code or software instructions in memory 704 and/or medium 720 in server 700, such as the velocity estimation module 724, shown in FIG. 7.

In one implementation, the first entity further receives an indication from the first sensing entity that a same oscillator is used by the first sensing entity for transmitting sensing signals and receiving sensing signals, e.g., as discussed in stage 1 of FIG. 5. For example, the indication that the same oscillator is used by the first sensing entity for transmitting sensing signals and receiving sensing signals may be an explicit indication or a capability message indicating that the first sensing entity supports dual direction bistatic RF sensing, as discussed in stage 1 of FIG. 5. The first entity may further send a dual direction bistatic RF sensing request to the first sensing entity and the second sensing entity, e.g., as discussed in stage 2 of FIG. 5. A means for receiving an indication from the first sensing entity that a same oscillator is used by the first sensing entity for transmitting sensing signals and receiving sensing signals may include the external interface 710, along with one or more processors 702 with dedicated hardware or implementing executable code or software instructions in memory 704 and/or medium 720 in server 700, such as the capability module 722, shown in FIG. 7. A means for sending a dual direction bistatic RF sensing request to the first sensing entity and the second sensing entity the external interface 710, along with one or more processors 702 with dedicated hardware or implementing executable code or software instructions in memory 704 and/or medium 720 in server 700, such as the sensing module 728, shown in FIG. 7.

In one implementation, the first sensing entity uses an oscillator that produces an oscillator error in generated frequencies used to receive the first sensing signal and transmit the second sensing signal, e.g., as discussed in reference to FIGS. 3A-3C, 4, and FIG. 5. The first frequency offset measurement may include a first oscillator error from the first sensing entity receiving the first sensing signal and a first Doppler shift caused by the velocity of the target object, and the second frequency offset measurement may include a second oscillator error from the first sensing entity transmitting the second sensing signal and a second Doppler shift caused by the velocity of the target object, and estimating the velocity of the target object based on both the first frequency offset of the first sensing signal and the second frequency offset of the second sensing signal may include cancelling the first oscillator error and the second oscillator error, e.g., as discussed in reference to FIGS. 3A-3C, and stages 8A, 8B, and 8C of FIG. 5.

In one implementation, the first estimate may estimate the velocity of the target object based on both the first frequency offset of the first sensing signal and the second frequency offset of the second sensing signal by averaging a normalized first frequency offset and a normalized second frequency offset, as discussed in reference to FIGS. 3A-3C, and stages 8A, 8B, and 8C of FIG. 5. A means for averaging a normalized first frequency offset and a normalized second frequency offset may include one or more processors 602 with dedicated hardware or implementing executable code or software instructions in memory 604 and/or medium 620 in sensing entity 600, such as the velocity estimation module 632, shown in FIG. 6, or one or more processors 702 with dedicated hardware or implementing executable code or software instructions in memory 704 and/or medium 720 in server 700, such as the velocity estimation module 724, shown in FIG. 7.

In one implementation, the first sensing entity is a user equipment (UE) and the second sensing entity is a transmission reception point (TRP), and the first sensing signal is associated with a UE identifier and the second sensing signal is associated with a TRP identifier and a resource identifier in assistance data sent to the first sensing entity, e.g., as discussed in stage 3 of FIG. 5.

In one implementation, the first sensing signal is associated with the second sensing signal in at least one of assistance data sent to the first sensing entity or a measurement report received from the first sensing entity with the first frequency offset measurement, e.g., as discussed in stages 3, 6 and 7 of FIG. 5.

In one implementation, the first sensing signal and the second sensing signal are scheduled to be transmitted within a predetermined amount of time of each other, e.g., as discussed in stages 3 and 4 of FIG. 5.

In one implementation, the first frequency offset measurement is received in a first measurement report and the second frequency offset measurement is received in a second measurement report, e.g., as discussed in stages 6 and 7 of FIG. 5. The first measurement report may identify the target object associated with the first frequency offset measurement or report a channel estimation associated with the first frequency offset measurement and the second measurement report may identify the target object associated with the second frequency offset measurement or report a channel estimation associated with the second frequency offset measurement, e.g., as discussed in stages 6 and 7 of FIG. 5.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a first sensing entity for supporting dual direction bistatic radio frequency (RF) sensing, comprising: transmitting a first sensing signal to be reflected by a target object and received by a second sensing entity, wherein the second sensing entity measures a first frequency offset of the first sensing signal; receiving a second sensing signal that is transmitted by the second sensing entity and reflected by the target object; measuring a second frequency offset of the second sensing signal, wherein a velocity of the target object is estimated based on both the first frequency offset of the first sensing signal and the second frequency offset of the second sensing signal.

Clause 2. The method of claim 1, further comprising sending an indication to the second sensing entity or a server that a same oscillator is used for transmitting sensing signals and receiving sensing signals.

Clause 3. The method of claim 2, wherein the indication that the same oscillator is used for transmitting sensing signals and receiving sensing signals comprises an explicit indication or a capability message indicating support of dual direction bistatic RF sensing.

Clause 4. The method of any of claims 1-3, wherein the first sensing entity uses an oscillator that produces an oscillator error in generated frequencies used for transmitting the first sensing signal and receiving the second sensing signal.

Clause 5. The method of claim 4, wherein the first frequency offset of the first sensing signal includes a first oscillator error from transmitting of the first sensing signal and a first Doppler shift caused by the velocity of the target object, and wherein the second frequency offset includes a second oscillator error from receiving the second sensing signal and a second Doppler shift caused by the velocity of the target object, and wherein a determination of the velocity of the target object estimated based on both the first frequency offset of the first sensing signal and the second frequency offset of the second sensing signal comprises cancelling the first oscillator error and the second oscillator error.

Clause 6. The method of any of claims 4-5, wherein the first sensing entity is a user equipment (UE) and the second sensing entity is one of a base station or another UE.

Clause 7. The method of claim 1, wherein the second sensing entity uses an oscillator that produces an oscillator error in generated frequencies used to receive the first sensing signal by the second sensing entity and to transmit the second sensing signal by the second sensing entity.

Clause 8. The method of claim 7, wherein the first frequency offset of the first sensing signal includes a first oscillator error from the second sensing entity receiving the first sensing signal and a first Doppler shift caused by the velocity of the target object, and wherein the second frequency offset includes a second oscillator error from the second sensing entity transmitting the second sensing signal and a second Doppler shift caused by the velocity of the target object, and wherein a determination of the velocity of the target object estimated based on both the first frequency offset of the first sensing signal and the second frequency offset of the second sensing signal comprises cancelling the first oscillator error and the second oscillator error.

Clause 9. The method of any of claims 7-8, wherein the second sensing entity is a user equipment (UE) and the first sensing entity is one of a base station or another UE.

Clause 10. The method of any of claims 1-9, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data received by the first sensing entity.

Clause 11. The method of any of claims 1-10, wherein the first sensing signal is associated with the second sensing signal in at least one of assistance data received by the first sensing entity or a measurement report transmitted by the first sensing entity.

Clause 12. The method of any of claims 1-11, wherein the first sensing signal and the second sensing signal are scheduled to be transmitted within a predetermined amount of time of each other.

Clause 13. The method of any of claims 1-12, further comprising sending a measurement report to the second sensing entity or a server.

Clause 14. The method of claim 13, wherein the measurement report identifies the target object associated with the second frequency offset or reports a channel estimation associated with the second frequency offset.

Clause 15. The method of any of claims 1-12, further comprising: receiving a measurement report from the second sensing entity with the first frequency offset measured by the second sensing entity; and estimating the velocity of the target object based on both the first frequency offset of the first sensing signal and the second frequency offset of the second sensing signal.

Clause 16. A first sensing entity configured for supporting dual direction bistatic radio frequency (RF) sensing, comprising: at least one wireless transceiver; at least one memory; and at least one processor coupled to the at least one wireless transceiver and the at least one memory, wherein the at least one processor is configured to cause the first sensing entity to: transmit a first sensing signal to be reflected by a target object and received by a second sensing entity, wherein the second sensing entity measures a first frequency offset of the first sensing signal; receive a second sensing signal that is transmitted by the second sensing entity and reflected by the target object; measure a second frequency offset of the second sensing signal, wherein a velocity of the target object is estimated based on both the first frequency offset of the first sensing signal and the second frequency offset of the second sensing signal.

Clause 17. The first sensing entity of claim 16, wherein the at least one processor is further configured to send an indication to the second sensing entity or a server that a same oscillator is used for transmitting sensing signals and receiving sensing signals.

Clause 18. The first sensing entity of claim 17, wherein the indication that the same oscillator is used for transmitting sensing signals and receiving sensing signals comprises an explicit indication or a capability message indicating support of dual direction bistatic RF sensing.

Clause 19. The first sensing entity of any of claims 16-18, wherein the first sensing entity uses an oscillator that produces an oscillator error in generated frequencies used for transmitting the first sensing signal and receiving the second sensing signal.

Clause 20. The first sensing entity of claim 19, wherein the first frequency offset of the first sensing signal includes a first oscillator error from transmitting of the first sensing signal and a first Doppler shift caused by the velocity of the target object, and wherein the second frequency offset includes a second oscillator error from receiving the second sensing signal and a second Doppler shift caused by the velocity of the target object, and wherein a determination of the velocity of the target object estimated based on both the first frequency offset of the first sensing signal and the second frequency offset of the second sensing signal comprises cancelling the first oscillator error and the second oscillator error.

Clause 21. The first sensing entity of any of claims 19-20, wherein the first sensing entity is a user equipment (UE) and the second sensing entity is one of a base station or another UE.

Clause 22. The first sensing entity of claim 16, wherein the second sensing entity uses an oscillator that produces an oscillator error in generated frequencies used to receive the first sensing signal by the second sensing entity and to transmit the second sensing signal by the second sensing entity.

Clause 23. The first sensing entity of claim 22, wherein the first frequency offset of the first sensing signal includes a first oscillator error from the second sensing entity receiving the first sensing signal and a first Doppler shift caused by the velocity of the target object, and wherein the second frequency offset includes a second oscillator error from the second sensing entity transmitting the second sensing signal and a second Doppler shift caused by the velocity of the target object, and wherein a determination of the velocity of the target object estimated based on both the first frequency offset of the first sensing signal and the second frequency offset of the second sensing signal comprises cancelling the first oscillator error and the second oscillator error.

Clause 24. The first sensing entity of any of claims 22-23, wherein the second sensing entity is a user equipment (UE) and the first sensing entity is one of a base station or another UE.

Clause 25. The first sensing entity of any of claims 16-24, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data received by the first sensing entity.

Clause 26. The first sensing entity of any of claims 16-25, wherein the first sensing signal is associated with the second sensing signal in at least one of assistance data received by the first sensing entity or a measurement report transmitted by the first sensing entity.

Clause 27. The first sensing entity of any of claims 16-26, wherein the first sensing signal and the second sensing signal are scheduled to be transmitted within a predetermined amount of time of each other.

Clause 28. The first sensing entity of any of claims 16-27, wherein the at least one processor is further configured to send a measurement report to the second sensing entity or a server.

Clause 29. The first sensing entity of claim 28, wherein the measurement report identifies the target object associated with the second frequency offset or reports a channel estimation associated with the second frequency offset.

Clause 30. The first sensing entity of any of claims 16-27, wherein the at least one processor is further configured to: receive a measurement report from the second sensing entity with the first frequency offset measured by the second sensing entity; and estimate the velocity of the target object based on both the first frequency offset of the first sensing signal and the second frequency offset of the second sensing signal.

Clause 31. A first sensing entity configured for supporting dual direction bistatic radio frequency (RF) sensing, comprising: means for transmitting a first sensing signal to be reflected by a target object and received by a second sensing entity, wherein the second sensing entity measures a first frequency offset of the first sensing signal; means for receiving a second sensing signal that is transmitted by the second sensing entity and reflected by the target object; means for measuring a second frequency offset of the second sensing signal, wherein a velocity of the target object is estimated based on both the first frequency offset of the first sensing signal and the second frequency offset of the second sensing signal.

Clause 32. A non-transitory storage medium including program code stored thereon, the program code is operable to configure at least one processor in a first sensing entity for supporting dual direction bistatic radio frequency (RF) sensing, the program code comprising instructions to: transmit a first sensing signal to be reflected by a target object and received by a second sensing entity, wherein the second sensing entity measures a first frequency offset of the first sensing signal; receive a second sensing signal that is transmitted by the second sensing entity and reflected by the target object; measure a second frequency offset of the second sensing signal, wherein a velocity of the target object is estimated based on both the first frequency offset of the first sensing signal and the second frequency offset of the second sensing signal.

Clause 33. A method performed by a first entity for supporting dual direction bistatic radio frequency (RF) sensing, comprising: obtaining a first frequency offset of a first sensing signal measured by a first sensing entity, the first sensing signal transmitted by a second sensing entity, reflected by a target object, and received by the first sensing entity; obtaining a second frequency offset of a second sensing signal measured by the second sensing entity, the second sensing signal transmitted by the first sensing entity, reflected by the target object, and received by the second sensing entity; and estimating a velocity of the target object based on both the first frequency offset measurement of the first sensing signal and the second frequency offset measurement of the second sensing signal.

Clause 34. The method of claim 33, further comprising: receiving an indication from the first sensing entity that a same oscillator is used by the first sensing entity for transmitting sensing signals and receiving sensing signals; and sending a dual direction bistatic RF sensing request to the first sensing entity and the second sensing entity.

Clause 35. The method of claim 34, wherein the indication that the same oscillator is used by the first sensing entity for transmitting sensing signals and receiving sensing signals comprises an explicit indication or a capability message indicating that the first sensing entity supports dual direction bistatic RF sensing.

Clause 36. The method of any of claims 33-35, wherein the first sensing entity uses an oscillator that produces an oscillator error in generated frequencies used to receive the first sensing signal and transmit the second sensing signal.

Clause 37. The method of claim 36, wherein the first frequency offset measurement includes a first oscillator error from the first sensing entity receiving the first sensing signal and a first Doppler shift caused by the velocity of the target object, and wherein the second frequency offset measurement includes a second oscillator error from the first sensing entity transmitting the second sensing signal and a second Doppler shift caused by the velocity of the target object, and wherein estimating the velocity of the target object based on both the first frequency offset of the first sensing signal and the second frequency offset of the second sensing signal comprises cancelling the first oscillator error and the second oscillator error.

Clause 38. The method of any of claims 33-37, wherein estimating the velocity of the target object based on both the first frequency offset of the first sensing signal and the second frequency offset of the second sensing signal comprises averaging a normalized first frequency offset and a normalized second frequency offset.

Clause 39. The method of any of claims 33-38, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data sent to the first sensing entity.

Clause 40. The method of any of claims 33-39, wherein the first sensing signal is associated with the second sensing signal in at least one of assistance data sent to the first sensing entity or a measurement report received from the first sensing entity with the first frequency offset measurement.

Clause 41. The method of any of claims 33-40, wherein the first sensing signal and the second sensing signal are scheduled to be transmitted within a predetermined amount of time of each other.

Clause 42. The method of any of claims 33-41, wherein the first frequency offset measurement is received in a first measurement report and the second frequency offset measurement is received in a second measurement report.

Clause 43. The method of claim 42, wherein the first measurement report identifies the target object associated with the first frequency offset measurement or reports a channel estimation associated with the first frequency offset measurement and the second measurement report identifies the target object associated with the second frequency offset measurement or reports a channel estimation associated with the second frequency offset measurement.

Clause 44. The method of any of claims 33-43, wherein the first entity is a server, the first sensing entity is a user equipment (UE), and the second sensing entity is one of a base station or another UE.

Clause 45. A first entity configured for supporting dual direction bistatic radio frequency (RF) sensing, comprising: an external interface; at least one memory; and at least one processor coupled to the external interface and the at least one memory, wherein the at least one processor is configured to cause the first entity to: obtain a first frequency offset of a first sensing signal measured by a first sensing entity, the first sensing signal transmitted by a second sensing entity, reflected by a target object, and received by the first sensing entity; obtain a second frequency offset of a second sensing signal measured by the second sensing entity, the second sensing signal transmitted by the first sensing entity, reflected by the target object, and received by the second sensing entity; and estimate a velocity of the target object based on both the first frequency offset measurement of the first sensing signal and the second frequency offset measurement of the second sensing signal.

Clause 46. The first entity of claim 45, wherein the at least one processor is further configured to: receive an indication from the first sensing entity that a same oscillator is used by the first sensing entity for transmitting sensing signals and receiving sensing signals; and send a dual direction bistatic RF sensing request to the first sensing entity and the second sensing entity.

Clause 47. The first entity of claim 46, wherein the indication that the same oscillator is used by the first sensing entity for transmitting sensing signals and receiving sensing signals comprises an explicit indication or a capability message indicating that the first sensing entity supports dual direction bistatic RF sensing.

Clause 48. The first entity of any of claims 45-47, wherein the first sensing entity uses an oscillator that produces an oscillator error in generated frequencies used to receive the first sensing signal and transmit the second sensing signal.

Clause 49. The first entity of claim 48, wherein the first frequency offset measurement includes a first oscillator error from the first sensing entity receiving the first sensing signal and a first Doppler shift caused by the velocity of the target object, and wherein the second frequency offset measurement includes a second oscillator error from the first sensing entity transmitting the second sensing signal and a second Doppler shift caused by the velocity of the target object, and wherein the at least one processor is configured to estimate the velocity of the target object based on both the first frequency offset of the first sensing signal and the second frequency offset of the second sensing signal by being configured to cancel the first oscillator error and the second oscillator error.

Clause 50. The first entity of any of claims 45-49, wherein the at least one processor is configured to estimate the velocity of the target object based on both the first frequency offset of the first sensing signal and the second frequency offset of the second sensing signal by being configured to average a normalized first frequency offset and a normalized second frequency offset.

Clause 51. The first entity of any of claims 45-50, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data sent to the first sensing entity.

Clause 52. The first entity of any of claims 45-51, wherein the first sensing signal is associated with the second sensing signal in at least one of assistance data sent to the first sensing entity or a measurement report received from the first sensing entity with the first frequency offset measurement.

Clause 53. The first entity of any of claims 45-52, wherein the first sensing signal and the second sensing signal are scheduled to be transmitted within a predetermined amount of time of each other.

Clause 54. The first entity of any of claims 45-53, wherein the first frequency offset measurement is received in a first measurement report and the second frequency offset measurement is received in a second measurement report.

Clause 55. The first entity of claim 54, wherein the first measurement report identifies the target object associated with the first frequency offset measurement or reports a channel estimation associated with the first frequency offset measurement and the second measurement report identifies the target object associated with the second frequency offset measurement or reports a channel estimation associated with the second frequency offset measurement.

Clause 56. The first entity of any of claims 45-55, wherein the first entity is a server, the first sensing entity is a user equipment (UE), and the second sensing entity is one of a base station or another UE.

Clause 57. A first entity configured for supporting dual direction bistatic radio frequency (RF) sensing, comprising: means for obtaining a first frequency offset of a first sensing signal measured by a first sensing entity, the first sensing signal transmitted by a second sensing entity, reflected by a target object, and received by the first sensing entity; means for obtaining a second frequency offset of a second sensing signal measured by the second sensing entity, the second sensing signal transmitted by the first sensing entity, reflected by the target object, and received by the second sensing entity; and means for estimating a velocity of the target object based on both the first frequency offset measurement of the first sensing signal and the second frequency offset measurement of the second sensing signal.

Clause 58. A non-transitory storage medium including program code stored thereon, the program code is operable to configure at least one processor in a first entity for supporting dual direction bistatic radio frequency (RF) sensing, the program code comprising instructions to: obtain a first frequency offset of a first sensing signal measured by a first sensing entity, the first sensing signal transmitted by a second sensing entity, reflected by a target object, and received by the first sensing entity; obtain a second frequency offset of a second sensing signal measured by the second sensing entity, the second sensing signal transmitted by the first sensing entity, reflected by the target object, and received by the second sensing entity; and estimate a velocity of the target object based on both the first frequency offset measurement of the first sensing signal and the second frequency offset measurement of the second sensing signal.

Therefore, it is intended that claimed subject matter not be limited to the particular examples disclosed, but that such claimed subject matter may also include all aspects falling within the scope of appended claims, and equivalents thereof.

What is claimed is:
1. A method performed by a first sensing entity for supporting dual direction bistatic radio frequency (RF) sensing, comprising:
   transmitting a first sensing signal to be reflected by a target object and received by a second sensing entity;
   receiving, from the second sensing entity, a first frequency offset that is measured based on the first sensing signal, wherein the first frequency offset is associated with a first oscillator error;
   receiving a second sensing signal that is transmitted by the second sensing entity and reflected by the target object;
   measuring a second frequency offset of the second sensing signal, wherein the second frequency offset is associated with a second oscillator error; and estimating a velocity of the target object based on averaging the first frequency offset and the second frequency offset for cancelling the first oscillator error and the second oscillator error.

2. The method of claim 1, further comprising sending an indication to the second sensing entity or a server that a same oscillator is used for transmitting sensing signals and receiving sensing signals, wherein estimation of the target object based on averaging the first frequency offset and the second frequency offset for cancelling the first oscillator error and the second oscillator error is based on the indication.

3. The method of claim 1, wherein the first sensing entity uses an oscillator that produces the first oscillator error when transmitting the first sensing signal and produces the second oscillator error when receiving the second sensing signal.

4. The method of claim 3, wherein the first frequency offset of the first sensing signal includes a first Doppler shift caused by the velocity of the target object, and wherein the second frequency offset includes a second Doppler shift caused by the velocity of the target object.

5. The method of claim 3, wherein the first sensing entity is a user equipment (UE) and the second sensing entity is one of a base station or another UE.

6. The method of claim 1, wherein the second sensing entity uses an oscillator that produces the first oscillator error when receiving the first sensing signal and produces the second oscillator error when transmitting the second sensing signal.

7. The method of claim 6, wherein the first frequency offset of the first sensing signal includes a first Doppler shift caused by the velocity of the target object, and wherein the second frequency offset includes a second Doppler shift caused by the velocity of the target object.

8. The method of claim 6, wherein the second sensing entity is a user equipment (UE) and the first sensing entity is one of a base station or another UE.

9. The method of claim 1, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data received by the first sensing entity.

10. The method of claim 1, wherein the first sensing signal is associated with the second sensing signal in at least one of assistance data received by the first sensing entity or a measurement report transmitted by the first sensing entity.

11. The method of claim 1, wherein the first sensing signal and the second sensing signal are scheduled to be transmitted within a predetermined amount of time of each other.

12. The method of claim 1, further comprising sending a measurement report to the second sensing entity or a server.

13. The method of claim 12, wherein the measurement report identifies the target object associated with the second frequency offset or reports a channel estimation associated with the second frequency offset.

14. A first sensing entity configured for supporting dual direction bistatic radio frequency (RF) sensing, comprising:
at least one wireless transceiver;
at least one memory; and
at least one processor coupled to the at least one wireless transceiver and the at least one memory, wherein the at least one processor is configured to cause the first sensing entity to:
transmit a first sensing signal to be reflected by a target object and received by a second sensing entity;
receive, from the second sensing entity, a first frequency offset that is measured based on the first sensing signal, wherein the first frequency offset is associated with a first oscillator error;
receive a second sensing signal that is transmitted by the second sensing entity and reflected by the target object;
measure a second frequency offset of the second sensing signal, wherein the second frequency offset is associated with a second oscillator error; and
estimating a velocity of the target object based on averaging the first frequency offset and the second frequency offset for cancelling the first oscillator error and the second oscillator error.

15. The first sensing entity of claim 14, wherein the at least one processor is further configured to send an indication to the second sensing entity or a server that a same oscillator is used for transmitting sensing signals and receiving sensing signals, wherein estimation of the target object based on averaging the first frequency offset and the second frequency offset for cancelling the first oscillator error and the second oscillator error is based on the indication.

16. The first sensing entity of claim 14, wherein the first sensing entity uses an oscillator that produces the first oscillator error when transmitting the first sensing signal and produces the second oscillator error when receiving the second sensing signal.

17. The first sensing entity of claim 16, wherein the first frequency offset of the first sensing signal includes a first Doppler shift caused by the velocity of the target object, and wherein the second frequency offset includes a second Doppler shift caused by the velocity of the target object.

18. The first sensing entity of claim 16, wherein the first sensing entity is a user equipment (UE) and the second sensing entity is one of a base station or another UE.

19. The first sensing entity of claim 14, wherein the second sensing entity uses an oscillator that produces the first oscillator error when receiving the first sensing signal and produces the second oscillator error when transmitting the second sensing signal.

20. The first sensing entity of claim 19, wherein the first frequency offset of the first sensing signal includes a first Doppler shift caused by the velocity of the target object, and wherein the second frequency offset includes a second Doppler shift caused by the velocity of the target object.

21. The first sensing entity of claim 19, wherein the second sensing entity is a user equipment (UE) and the first sensing entity is one of a base station or another UE.

22. The first sensing entity of claim 14, wherein the first sensing entity is a user equipment (UE) and the second sensing entity is a transmission reception point (TRP), and the first sensing signal is associated with a UE identifier and the second sensing signal is associated with a TRP identifier and a resource identifier in assistance data received by the first sensing entity.

23. The first sensing entity of claim 14, wherein the first sensing signal is associated with the second sensing signal in at least one of assistance data received by the first sensing entity or a measurement report transmitted by the first sensing entity.

24. The first sensing entity of claim 14, wherein the first sensing signal and the second sensing signal are scheduled to be transmitted within a predetermined amount of time of each other.

25. The first sensing entity of claim 14, wherein the at least one processor is further configured to send a measurement report to the second sensing entity or a server.

26. The first sensing entity of claim 25, wherein the measurement report identifies the target object associated with the second frequency offset or reports a channel estimation associated with the second frequency offset.

27. A first sensing entity configured for supporting dual direction bistatic radio frequency (RF) sensing, comprising:
- means for transmitting a first sensing signal to be reflected by a target object and received by a second sensing entity;
- means for receiving, from the second sensing entity, a first frequency offset that is measured based on the first sensing signal, wherein the first frequency offset is associated with a first oscillator error;
- means for receiving a second sensing signal that is transmitted by the second sensing entity and reflected by the target object;
- means for measuring a second frequency offset of the second sensing signal, wherein the second frequency offset is associated with a second oscillator error; and
- means for estimating a velocity of the target object based on averaging the first frequency offset and the second frequency offset for cancelling the first oscillator error and the second oscillator error.

28. A non-transitory storage medium including program code stored thereon, the program code is operable to configure at least one processor in a first sensing entity for supporting dual direction bistatic radio frequency (RF) sensing, the program code comprising instructions to:
- transmit a first sensing signal to be reflected by a target object and received by a second sensing entity;
- receiving, from the second sensing entity, a first frequency offset that is measured based on the first sensing signal, wherein the first frequency offset is associated with a first oscillator error;
- receive a second sensing signal that is transmitted by the second sensing entity and reflected by the target object;
- measure a second frequency offset of the second sensing signal, wherein the second frequency offset is associated with a second oscillator error; and
- estimating a velocity of the target object based on averaging the first frequency offset and the second frequency offset for cancelling the first oscillator error and the second oscillator error.

* * * * *